(12) United States Patent
Igeta et al.

(10) Patent No.: US 11,474,387 B2
(45) Date of Patent: Oct. 18, 2022

(54) DISPLAY APPARATUS

(71) Applicant: Japan Display Inc., Tokyo (JP)

(72) Inventors: Koichi Igeta, Tokyo (JP); Hidehiro Sonoda, Tokyo (JP)

(73) Assignee: Japan Display Inc., Tokyo (JP)

( * ) Notice: Subject to any disclaimer, the term of this patent is extended or adjusted under 35 U.S.C. 154(b) by 51 days.

(21) Appl. No.: 17/115,106

(22) Filed: Dec. 8, 2020

(65) Prior Publication Data

US 2021/0088829 A1 Mar. 25, 2021

Related U.S. Application Data

(63) Continuation of application No. PCT/JP2019/012570, filed on Mar. 25, 2019.

(30) Foreign Application Priority Data

Jun. 11, 2018 (JP) ............................. JP2018-111064

(51) Int. Cl.
| | | |
|---|---|---|
| *G09G 3/36* | (2006.01) | |
| *G02F 1/1333* | (2006.01) | |
| *G02F 1/1337* | (2006.01) | |
| *G02F 1/1339* | (2006.01) | |
| *G02F 1/1362* | (2006.01) | |
| *G02F 1/1345* | (2006.01) | |

(52) U.S. Cl.
CPC ...... *G02F 1/133305* (2013.01); *G02F 1/1339* (2013.01); *G02F 1/133707* (2013.01); *G02F 1/136286* (2013.01); *G02F 1/13452* (2013.01)

(58) Field of Classification Search
CPC ............. G02F 1/133305; G02F 1/1337; G02F 1/133707; G02F 1/1339; G02F 1/13394; G02F 1/13452; G02F 1/1362; G02F 1/136286; G06F 1/1652; G06F 1/1656; G06F 1/1681; G09F 9/301
See application file for complete search history.

(56) References Cited

U.S. PATENT DOCUMENTS

| | | | |
|---|---|---|---|
| 2003/0151710 A1* | 8/2003 | Tanaka ................. | G02F 1/1395 349/123 |
| 2016/0293870 A1* | 10/2016 | Nakagawa .......... | H01L 51/5246 |
| 2017/0011693 A1* | 1/2017 | Park ..................... | G09G 3/3625 |
| 2017/0200915 A1 | 7/2017 | Lee et al. | |
| 2018/0088380 A1 | 3/2018 | Oka et al. | |

FOREIGN PATENT DOCUMENTS

| | | |
|---|---|---|
| JP | 2009-115933 A | 5/2009 |
| JP | 2009-294544 A | 12/2009 |
| JP | 2017-126061 A | 7/2017 |
| JP | 2018-49193 A | 3/2018 |
| WO | WO 2015/122032 A1 | 8/2015 |

OTHER PUBLICATIONS

International Search Report dated Apr. 23, 2019 in PCT/JP2019/012570 filed Mar. 25, 2019, 2 pages.

* cited by examiner

*Primary Examiner* — Insa Sadio
(74) *Attorney, Agent, or Firm* — Maier & Maier, PLLC

(57) ABSTRACT

A display apparatus (DSP1) includes: a flexible substrate (10) configured to include a region (DA1) and a region (DA2) on its surface; a liquid crystal film (LQ); and a photolytic alignment film configured to be in contact with the liquid crystal film (LQ). A material of the alignment film (AL1) in the region (DA1) is different from a material of the alignment film (AL2) in the region (DA2).

18 Claims, 13 Drawing Sheets

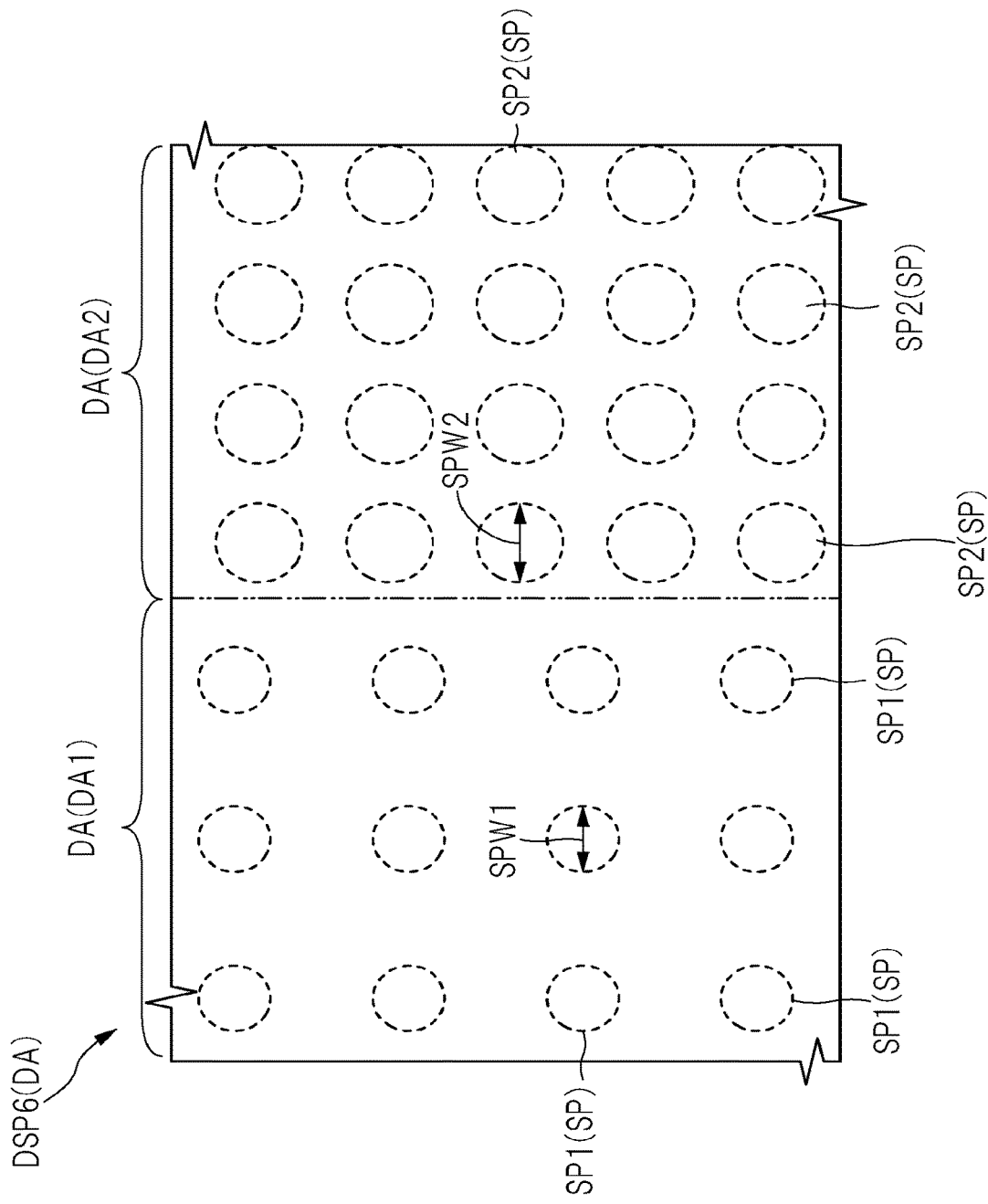

DISPLAY APPARATUS

TECHNICAL FIELD

The present invention relates to a display apparatus, and relates to, for example, a technique effectively applied to a foldable liquid crystal display apparatus.

BACKGROUND ART

As an aspect of display apparatuses, foldable display apparatuses have been studied (Japanese Patent Application Laid-Open Publication No. 2017-126061 (Patent Document 1)).

RELATED ART DOCUMENT

Patent Document

Patent Document 1: Japanese Patent Application Laid-Open Publication No. 2017-126061

SUMMARY OF THE INVENTION

Problems to be Solved by the Invention

The inventors of the present application have researched and developed a foldable display apparatus. It has been found that a liquid crystal display apparatus as the foldable display apparatus has the following issues. The liquid crystal display apparatus includes an alignment film in contact with a liquid crystal layer in order to orient liquid crystals that control light transmission. When the alignment film exists in a foldable region, a part of the alignment film is partially peeled off because of a force generated at the time of the folding in some cases. When a part of the peeled alignment film exists inside the liquid crystal layer, this peeled portion of the alignment film disorders the alignments of the liquid crystals, and becomes a cause of reduction in a display quality.

A purpose of the present invention is to provide a technique for improving a performance of a display apparatus.

Means for Solving the Problems

A display apparatus according to an aspect of the present invention includes: a flexible first substrate having a first region and a second region on its surface; a liquid crystal layer; and a photolytic alignment film in contact with the liquid crystal layer. A material of the alignment film in the first region is different from a material of the alignment film in the second region.

A display apparatus according to another aspect of the present invention includes: a flexible first substrate having a first region and a second region on its surface; a liquid crystal layer; and an alignment film in contact with the liquid crystal layer. The alignment film contains a first polyimide with a cyclobutane ring having a substituent group and a second polyimide an unsubstituted cyclobutane ring. The alignment film includes a first "A" film in the first region and a first "B" film between the first A film and the first substrate. The alignment film includes a second "A" film in the second region and a second "B" film between the second A film and the first substrate. A mass ratio of the first polyimide to the second polyimide is higher in the first A film than the second A film.

BRIEF DESCRIPTIONS OF THE DRAWINGS

FIG. 14 is an enlarged planar view of a display apparatus according to a modification example of FIG. 12.

BEST MODE FOR CARRYING OUT THE INVENTION

Figure 1:
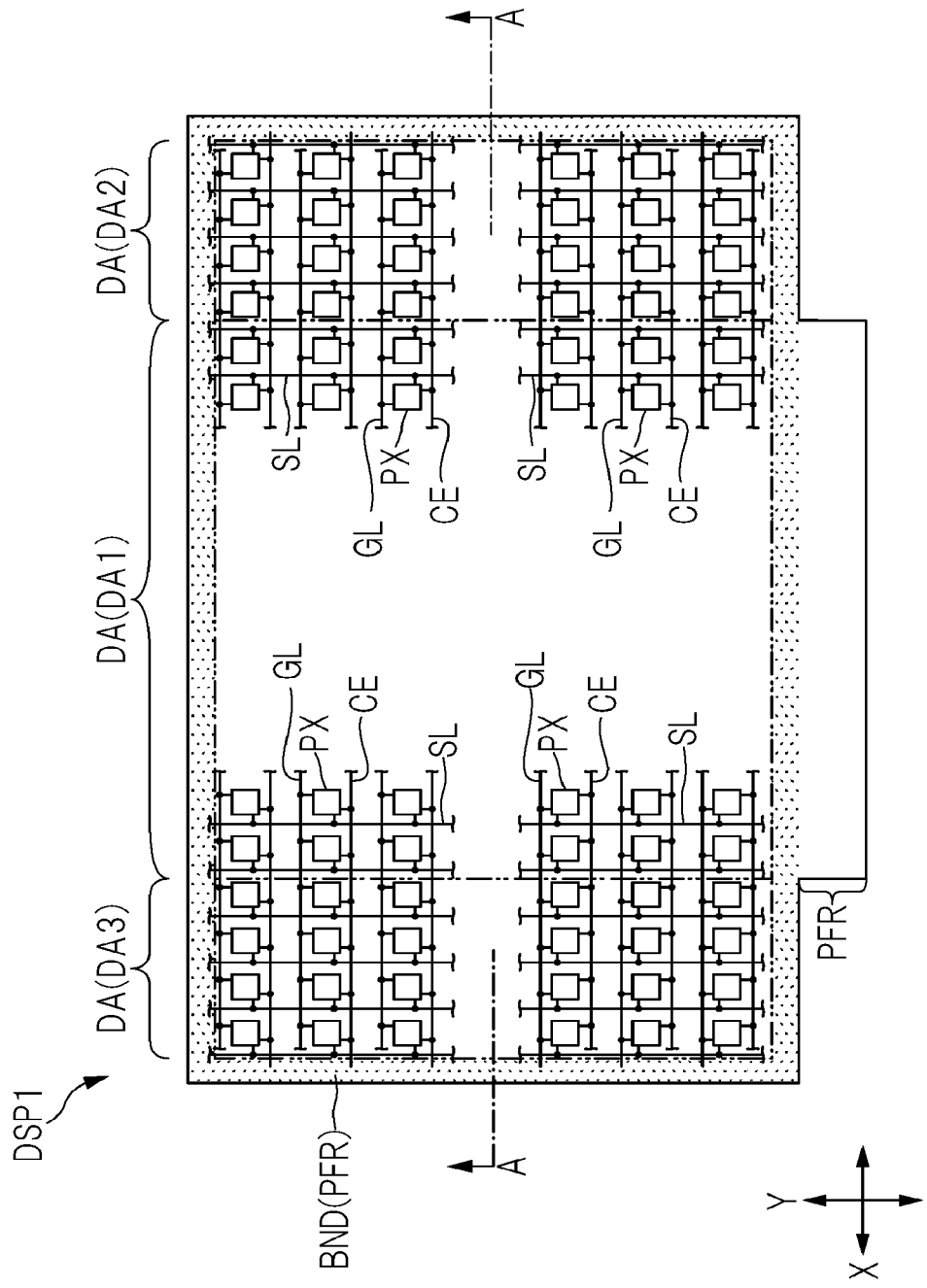
FIG. 1 is a planar view showing an example of a display apparatus according to an embodiment.

The following is explanation about each embodiment of the present invention with reference to drawings. Note that only one example is disclosed, and appropriate modification with keeping the concept of the present invention which can be easily anticipated by those who are skilled in the art is obviously within the scope of the present invention. Also, in order to make the clear description, a width, a thickness, a shape, and others of each portion in the drawings are schematically illustrated more than those in an actual aspect in some cases. However, the illustration is only an example, and does not limit the interpretation of the present invention. In the present specification and each drawing, similar elements to those described earlier for the already-described drawings are denoted with the same or similar reference characters, and detailed description for them is appropriately omitted in some cases.

First Embodiment

<Configuration of Display Apparatus>

First, a configuration of a display apparatus will be explained. FIG. 1 is a planar view showing an example of a display apparatus according to the present embodiment. In FIG. 1, a boundary between a display region DA and a peripheral region PFR in a planar view is illustrated with a dashed double-dotted line. And, in FIG. 1, a part of a circuit block and a wiring of a circuit included in a display apparatus DSP1 is schematically illustrated with a solid line.

Figure 2:
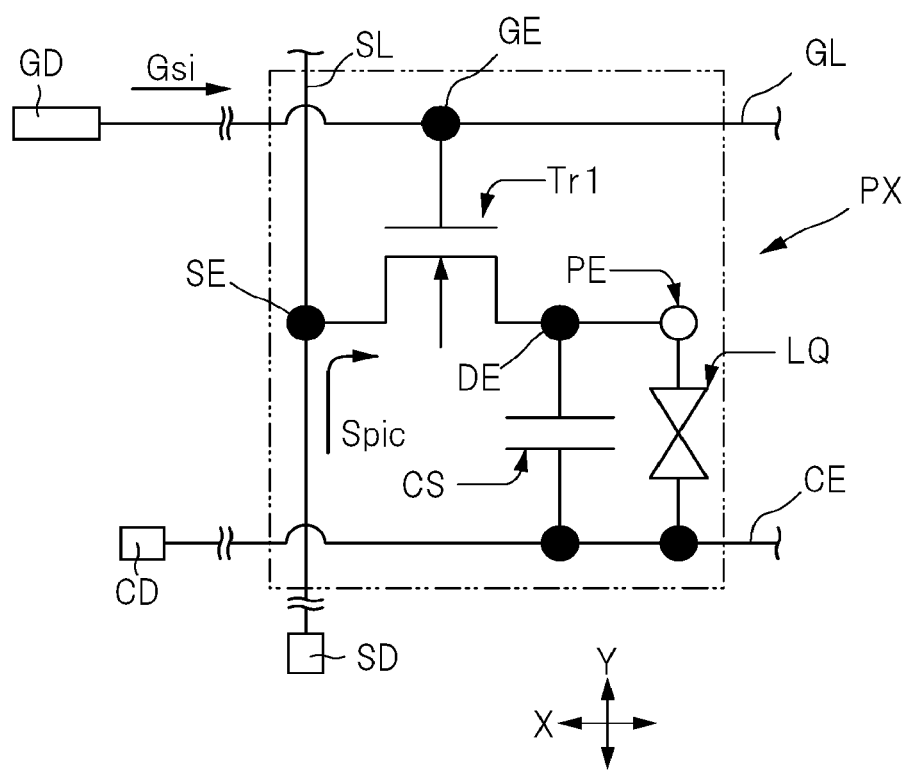
FIG. 2 is a circuit block diagram showing a configuration example of a circuit included in each of a plurality of pixels shown in FIG. 1.
Figure 3:
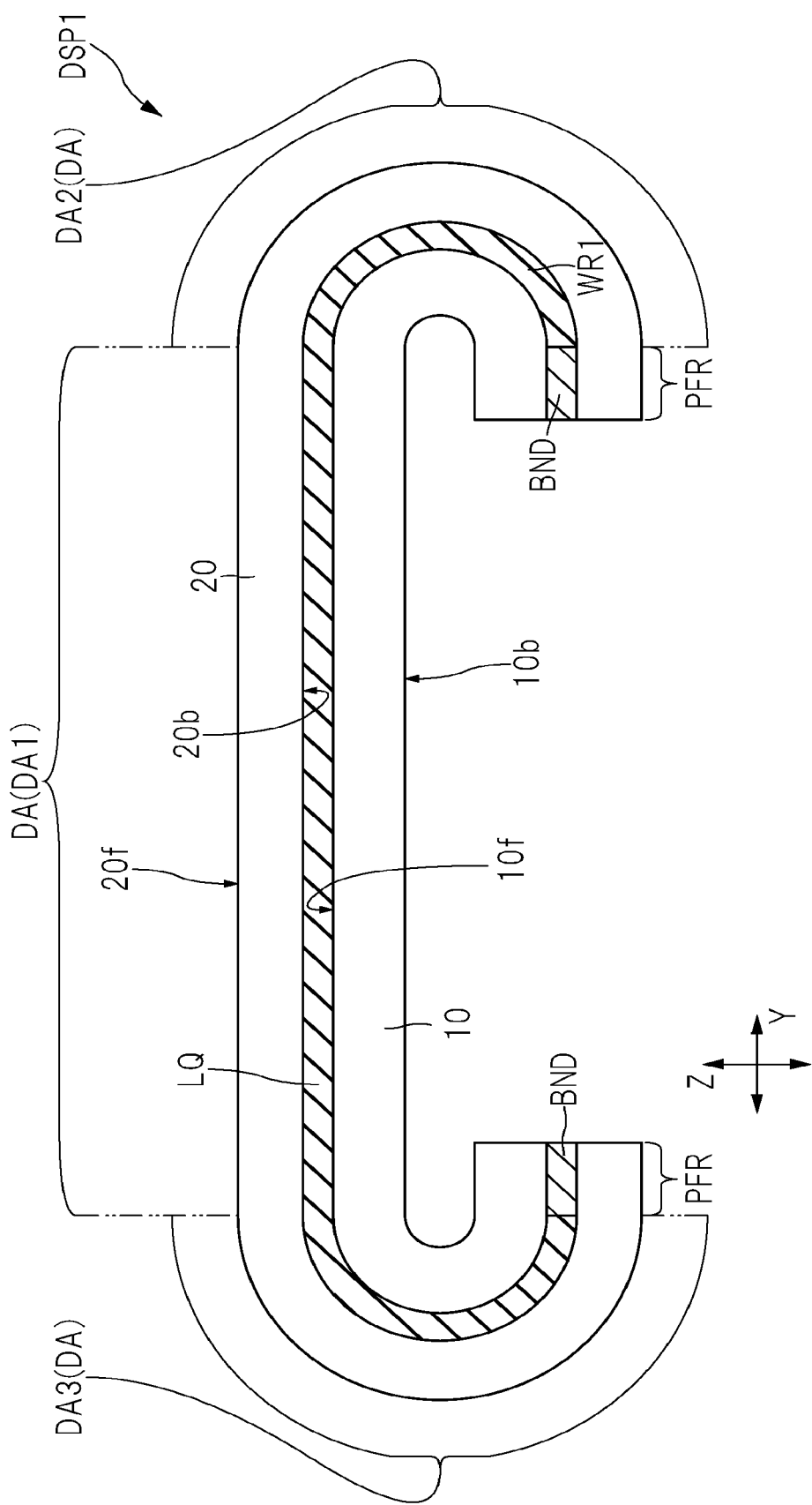
FIG. 3 is a cross-sectional view taken along a line A-A of FIG. 1.
Figure 4:
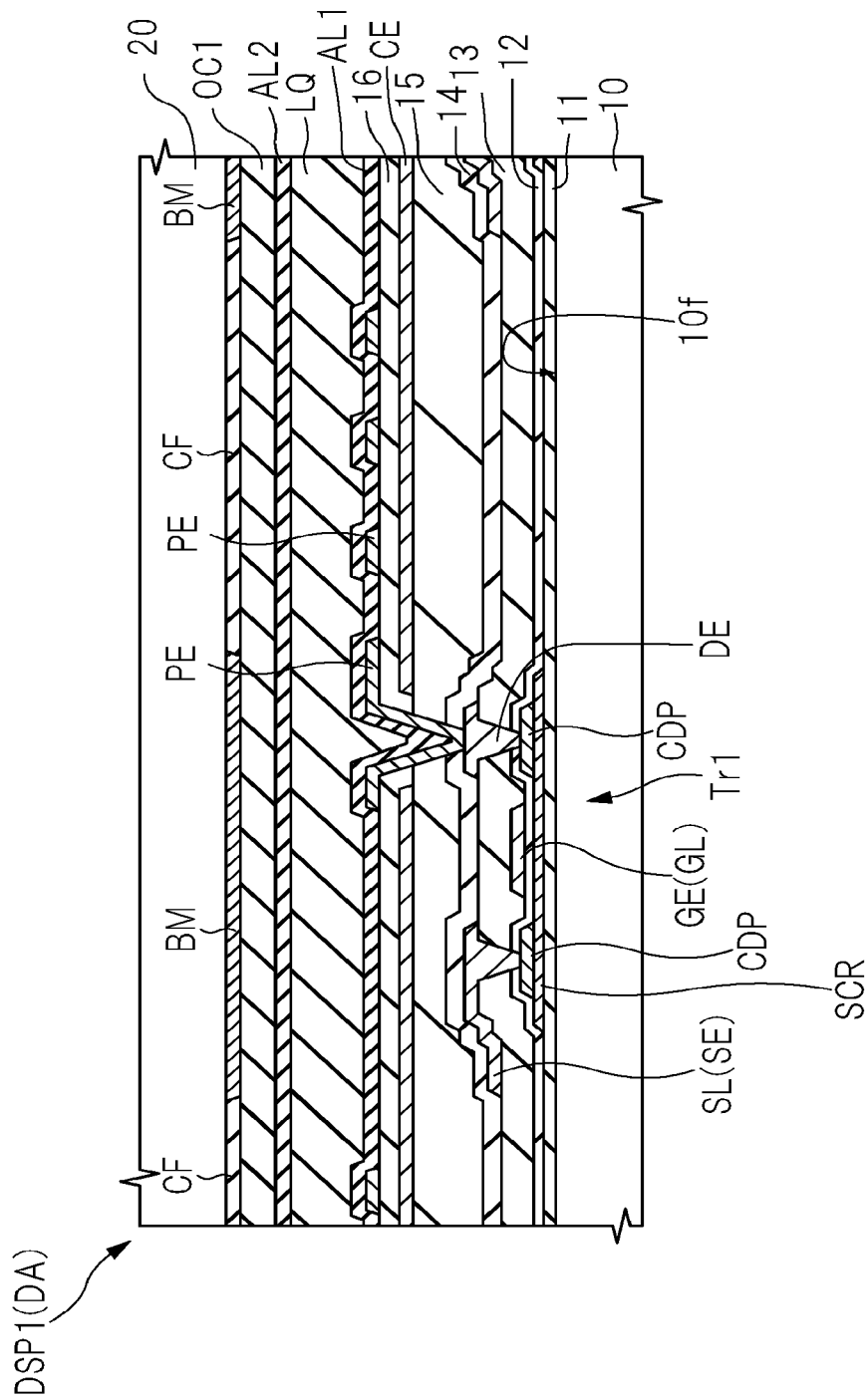
FIG. 4 is an enlarged cross-sectional view of a part of a display region of FIG. 1.

FIG. 2 is a circuit block diagram showing a configuration example of a circuit included in each of a plurality of pixels shown in FIG. 1. FIG. 3 is a cross-sectional view taken along a line A-A of FIG. 1. Although FIG. 3 is a cross-sectional view, hatching is eliminated except in a liquid crystal layer LQ in order to easily view the cross-sectional view. The display apparatus DPS1 that is the liquid crystal display apparatus includes not only the substrates 10 and 20 and the liquid crystal film LQ shown in FIG. 1 but also various components such as a polarizer, a light source (backlight) or a wiring substrate connected to the substrate 10. In FIG. 3, illustration of these components is omitted. FIG. 4 is an enlarged cross-sectional view of a part of a display region of FIG. 1.

As shown in FIG. 1, the display apparatus DSP1 of the present embodiment includes the display region DA where an image is formed in accordance with an input signal supplied from outside. The display region DA is an effective region where an image that is visually recognized by a viewer is displayed. In a case of the present embodiment, the display region DA includes a region (first region) DA1, a region (second region) DA2 and a region (third region) DA3. The regions DA2 and DA3 of the display region DA are foldable regions. In other words, each of the regions DA2 and DA3 has a structure expected to be folded during use or carrying. The region DA1 of the display region DA is a region not expected to be folded (in other words, a region that is not foldable). The structure expected to be folded means not only a simply physically foldable structure but also a structure having a countermeasure for an issue that is caused by the folding of the display region DA. Therefore, the structure may be configured so that, for example, the region DA1 is physically foldable in some cases. Details of the issue caused by the folding of the display region DA will be described later.

The display apparatus DSP1 includes the peripheral region PFR in periphery of the display region DA in a planar view. The peripheral region PFR has a sealing member BND surrounding the periphery of the display region DA. Also, the peripheral region PFR has a plurality of wirings connected to a plurality of transistors that are arranged inside the display region DA are arranged.

In the display region DA, a plurality of pixels PX are arranged. The plurality of pixels PX are arranged in a matrix form along an X direction and a Y direction crossing the X direction. Each of the plurality of pixels PX includes a transistor Tr1 (see FIG. 2) functioning as a pixel selecting switch and a pixel electrode PE (See FIG. 2) connected to the transistor Tr1. In the display region DA, a plurality of scan lines (gate lines) GL extending in the X direction and a plurality of image signal lines (source lines) SL extending in the Y direction are arranged. In an example shown in FIG. 1, the plurality of scan lines GL are arranged in the Y direction, and the plurality of image signal lines SL are arranged in the X direction. In the display region DA, a common electrode CE is arranged. The common electrode CE is an electrode that supplies a common potential to be applied to each of the pixels PX, and, for example, overlays each of the plurality of pixels PX.

Each of the plurality of image signal lines SL is connected to the pixel electrode PE through the transistor Tr1 as shown in FIG. 2. More specifically, the image signal line SL is connected to a source electrode SE of the transistor Tr1, and the pixel electrode PE is connected to a drain electrode DE of the transistor Tr1. When the transistor Tr1 is turned ON, an image signal Spic is supplied from the image signal line SL to the pixel electrode PE. The image signal Spic is supplied from a signal-line driving circuit SD. The image signal line SL inside the display region DA is electrically connected to the signal-line driving circuit SD through a connecting wiring (also referred to as a draw-out wiring). The signal-line driving circuit SD supplies the image signal Spic through the image signal line SL to the pixel electrode PE included in each of the plurality of pixels PX. The signal-line driving circuit SD is arranged out of the display region DA shown in FIG. 1 (for example, arranged in the peripheral region PFR or a wiring substrate or a semiconductor component connected to the substrate 10 in the peripheral region PFR).

Each of the plurality of scan lines GL drives the transistor Tr1 as shown in FIG. 2. More specifically, a part of the scan line GL configures the gate electrode GE of the transistor Tr1. Each of the plurality of scan lines GL is drawn out to the peripheral region PFR out of the display region DA, and is connected to a scan-line driving circuit (gate driving circuit) GD shown in FIG. 2. The scan-line driving circuit GD is a scan-signal output circuit that outputs a scan signal Gsi input to the plurality of scan lines GL. The scan-line driving circuit GD is arranged in the peripheral region PFR shown in FIG. 1. The transistor Tr1 is a thin film transistor (TFT) that functions as a selecting switch for selecting the pixel PX. The scan line GL includes the gate electrode GE of the transistor Tr1.

In FIG. 3, the display apparatus DSP1 includes the substrate 10. The display apparatus DSP1 includes the substrate 20 facing the substrate 10 through the liquid crystal film LQ. The substrate 10 includes a front surface (main surface, front surface) 10$f$ facing the liquid crystal film LQ and a back surface (main surface, rear surface) 10$b$ opposite to the front surface 10$f$. The substrate 20 includes aback surface (main surface, rear surface) 20$b$ facing the liquid crystal film LQ and a front surface (main surface, front surface) 20$f$ opposite to the back surface 20$b$. Each of the front surface 10$f$ and the back surface 10$b$ of the substrate 10 includes a region (first region) DA1, a region (second region) DA2 and a region (third region) DA3. Each of the front surface 20$f$ and the back surface 20$b$ of the substrate 20 includes a region (first region) DA1, a region (second region) DA2 and a region (third region) DA3.

The region DA2 and the region DA3 of each of the substrate 10 and the substrate 20 are foldable. Therefore, each of the substrate 10 and the substrate 20 has flexibility in at least the region DA2 and the region DA3. In the present embodiment, each of the substrate 10 and the substrate 20 has flexibility in the region DA1, the region DA2 and the region DA3. In order to provide the flexibility to each of the substrate 10 and the substrate 20, each of the substrate 10 and the substrate 20 is made of a resin material (organic material) containing a polymer such as polyimide, polyamide, polycarbonate or polyester.

A circuit component including the transistor Tr1 configuring the pixel PX shown in FIG. 2 is formed on the substrate 10 as shown in FIG. 4. The display region DA of the display apparatus DSP1 has an insulating film 11 on the front surface 10$f$ of the substrate 10. The insulating film 11 is abase layer of various circuits including the TFT, and is made of an inorganic insulating material such as silicon nitride (SiN) or silicon oxide (SiO).

On the insulating film 11 that is the base layer, the transistor Tr1 that is the TFT is formed. FIG. 4 shows one transistor Tr1 as an example. The transistor Tr1 is a thin film transistor (TFT). The transistor Tr1 includes a semiconductor region (semiconductor layer) SCR making the channel region, the source region and the drain region. The semiconductor region SCR is made of, for example, polysilicon, and is formed on the insulating film 11. In the source region and the drain region of the semiconductor region SCR, a conductor pattern CDP that is connected to the source electrode SE or the drain electrode DE of the transistor Tr1 is formed. The conductor pattern CDP is formed by, for example, a sputtering method.

The semiconductor region SCR is covered with an insulating film 12 that is a gate insulating film. The insulating film 12 is made of, for example silicon oxide, and is deposited on the semiconductor region SCR and the conductor pattern CDP by chemical vapor deposition (CVD) as an example. On the insulating film 12, the gate electrode GE is formed. The gate electrode GE is formed at a position overlapping the channel region of the semiconductor region SCR. In other words, the gate electrode faces the channel region of the semiconductor region SCR through the insulating film 12 that is the gate insulating film. The gate electrode GE is formed by patterning a metal film that is formed by a sputtering method or others. The plurality of scan lines GL shown in FIG. 1 are formed in the same layer as that of the gate electrode GE although illustration is omitted.

The gate electrode GE and the insulating film 12 are covered with an insulating film 13. The insulating film 13 is made of, for example, silicon nitride, silicon oxide or a layered film of these materials. The insulating film 13 is formed by, for example, a CVD method. On the insulating film 13, the source electrode SE and the drain electrode DE made of the metal film are arranged. The insulating film 12 and the insulating film 13 have a contact hole penetrating the insulating films 12 and 13 in a thickness direction, and the source electrode SE is connected to the conductor pattern CDP on the source region through the contact hole. The drain electrode DE is connected to the conductor pattern CDP on the drain region through the contact hole. The source electrode SE and the drain electrode DE are formed by, for example, a sputtering method. The plurality of signal lines SL shown in FIG. 1 are formed in the same layer as those of the source electrode and the drain electrode.

The source electrode SE, the drain electrode DE and the insulating film 13 are covered with an insulating film 14. The insulating film 14 is made of, for example, silicon nitride, silicon oxide or a layered film of these materials. The insulating film 14 is formed by, for example, a CVD method.

On the insulating film 14, an organic film (planarizing film, organic insulating film) 15 is formed. The organic film 15 is made of, for example, an organic material such as an acrylic resin. A thickness of the organic film 15 is larger than each thickness of another insulating films 11, 12, 13 and 14. The organic film 15 covers the transistor Tr1.

On the organic film 15, the common electrode CE is formed. In a display period in which the display apparatus DSP1 displays the image, a driving potential that is common among the plurality of pixels PX (see FIG. 1) is supplied to the common electrode CE. The common driving potential is supplied from a common-electrode driving circuit CD shown in FIG. 2. The common electrode CE is arranged in the entire display region DA. The common electrode CE is made of a transparent conductive material such as ITO (Indium Tin Oxide) or IZO (Indium Zinc Oxide). The common electrode CE is covered with an insulating film 16. The insulating film 16 is made of, for example, silicon nitride, silicon oxide or a layered film of these materials. The insulating film 16 is formed by, for example, a CVD method.

In an example shown in FIG. 4, the pixel electrode PE is formed on the insulating film 16. In the example shown in FIG. 4, the common electrode CE and the pixel electrode PE are formed in a different layer from each other. However, as a modification example, a plurality of the common electrodes CE and a plurality of the pixel electrodes PE may be formed on the same plane as each other (for example, on the organic film 15), and may be arranged to be staggered so that the electrode are adjacent to each other. The pixel electrode PE is preferably made of, for example, a transparent conductive material or metallic material such as ITO or IZO. The pixel electrode PE is connected to the drain electrode DE through the contact hole that is formed so as to penetrate the insulating film 16 and the organic film 15.

When a different potential is supplied to the pixel electrode PE and the common electrode CE in the display period, electric lines of force that connect the pixel electrode PE and the common electrode CE are generated. The liquid crystal molecules of the liquid crystal film LQ are rotated by an electric field generated at this time.

Each of the plurality of pixel electrodes PE is covered with the alignment film AL1. The alignment film AL1 is an insulating film having a function of ordering initial alignments of the liquid crystal molecules included in the liquid crystal film LQ, and is made of, for example, a polyimide resin. The alignment film AL1 is between the substrate 10 and the liquid crystal film LQ, and is in contact with the liquid crystal layer. The alignment film AL1 is in contact with the liquid crystal film LQ. The alignment film AL1 will be described in detail later.

The display apparatus DSP1 includes a light blocking film BM, a color filter CF, an insulating film OC1 and an alignment film AL2 between the back surface (main surface, plane) 20b of the substrate 20 and the liquid crystal film LQ.

The color filter CF is formed to be closer to the back surface 20b of the substrate 20. As the color filter CF, color filters CF of three colors that are red (R), green (G) and blue (B) are periodically arranged. The light blocking film BM is arranged at a boundary between the color filters CF of respective colors. The light blocking film BM is called a black matrix, and is made of, for example, a black resin or a low-reflective metal. The light blocking film BM is formed to have, for example, a grid shape in a planar view.

The insulating film OC1 shown in FIG. 4 covers the color filter CF. The insulating film OC1 functions as a protective film that prevents impurities from spreading from the color filter to the liquid crystal layer. The insulating film OC1 is an organic insulating film made of, for example, an acrylic-based photosensitive resin or others. On the insulating film OC1, the alignment film AL2 is arranged. The alignment film AL2 is between the substrate 20 and the liquid crystal film LQ, and is in contact with the liquid crystal film LQ. Each of the alignment film AL1 and the alignment film AL2 is an optical alignment film, alignment of which is treated by being subjected to the emission of polarized ultraviolet ray.

<Alignment Film>

Figure 5:
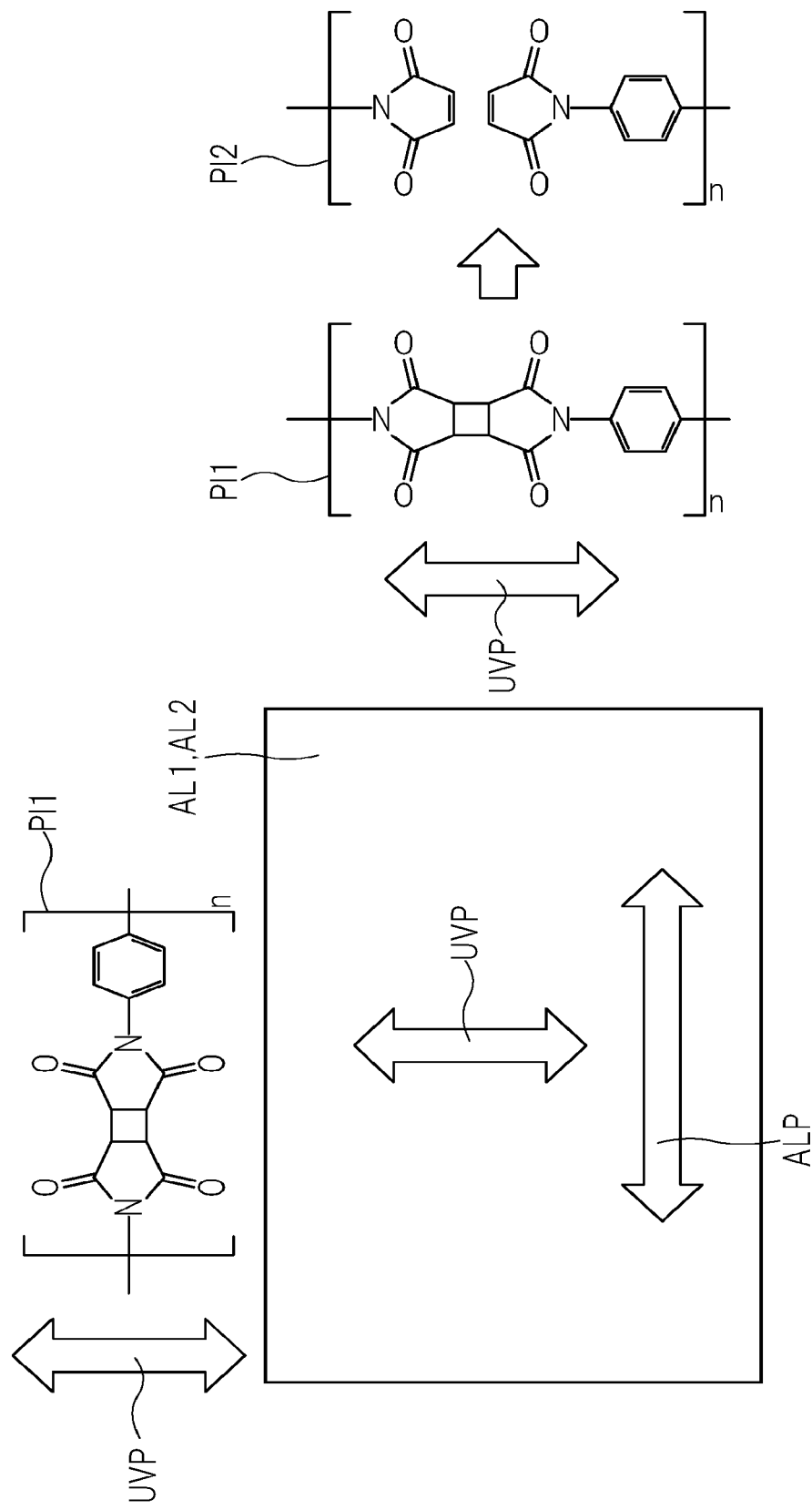
FIG. 5 is an explanatory diagram showing an example of a relation between an alignment axis of an alignment film and a polarization axis of ultraviolet ray emitted to the alignment film.

Next, a detailed structure of the alignment film shown in FIG. 4 will be explained. FIG. 5 is an explanatory diagram showing an example of a relation between an alignment axis of the alignment film and a polarization axis of the ultraviolet ray emitted to the alignment film. Each of the alignment film AL1 and the alignment film AL2 is a film formed by imidization of polyamide acid or polyamide acid ester. The optical alignment treatment for the alignment films AL1 and AL2 is performed by emitting the polarized ultraviolet ray having a wavelength of, for example, about 250 nm to the alignment films AL1 and AL2. As an example of the alignment films AL1 and AL2, the following explanation will be made about the alignment film AL1 that is formed between the substrate 10 and the liquid crystal film LQ shown in FIG. 4 as a typical example. However, the similar explanation is also made about the alignment film AL2 that is formed between the substrate 20 and the liquid crystal film LQ.

In an example shown in FIG. 5, when ultraviolet ray having a polarization axis UVP in the Y direction is emitted to the alignment film AL1, the alignment film AL1 has an alignment axis ALP in the X direction crossing the Y direction. The alignment film AL1 before the optical alignment treatment contains polyimide PI1 having a main chain that is randomly directed in various directions on an X-Y plane. In the optical alignment treatment, when the ultraviolet ray having the polarization axis UVP is emitted to the alignment film AL1, a polyimide PI1 having a main chain that is directed in parallel to the polarization axis UVP of the ultraviolet ray absorbs much of the polarized ultraviolet ray, so that a cyclobutane ring included in the polyimide PI1 is cleaved as schematically shown in FIG. 5, and a composition PI2 having a fractionated polyimide PI1 is formed. On the other hand, a polyimide PI1 having a main chain that is directed in orthogonal to the polarization axis UVP of the ultraviolet ray hardly absorbs the ultraviolet ray, and is not fractionated.

While the composition PI2 having the fractionated polyimide PI1 does not contribute to the alignments of the liquid crystal molecules, the non-fractionated polyimide PI1 contributes to the alignments of the liquid crystal molecules. Therefore, the polyimide PI1 having the main chain that is directed in parallel to the polarization axis UVP is selectively fractionated by being subjected to the emission of the ultraviolet ray having the polarization axis UVP, so that the alignment film AL1 having an alignment axis ALP in a direction in orthogonal to the polarization axis UVP is obtained.

When the alignment film AL1 is used so as not to be folded, there is no particular issue even if the alignment film AL1 contains the composition PI2. However, when the alignment film AL1 is used so that a partial region of the display region DA is folded as described in the present embodiment, it has been found that an issue based on a small mechanical strength of the alignment film AL1 arises. In other words, when the alignment film AL1 containing the composition PI2 is folded, a part of the alignment film AL1 is peeled off from a folded portion of a main body. When a part of the alignment film AL1 is peeled off, the alignments of the liquid crystal molecules of the liquid crystal film LQ shown in FIG. 4 are interrupted by peeled dusts. As a result, when a portion having the interrupted alignments of the liquid crystal molecules is visually recognized as a small bright spot, the portion becomes the cause of the reduction in the display quality.

Figure 6:
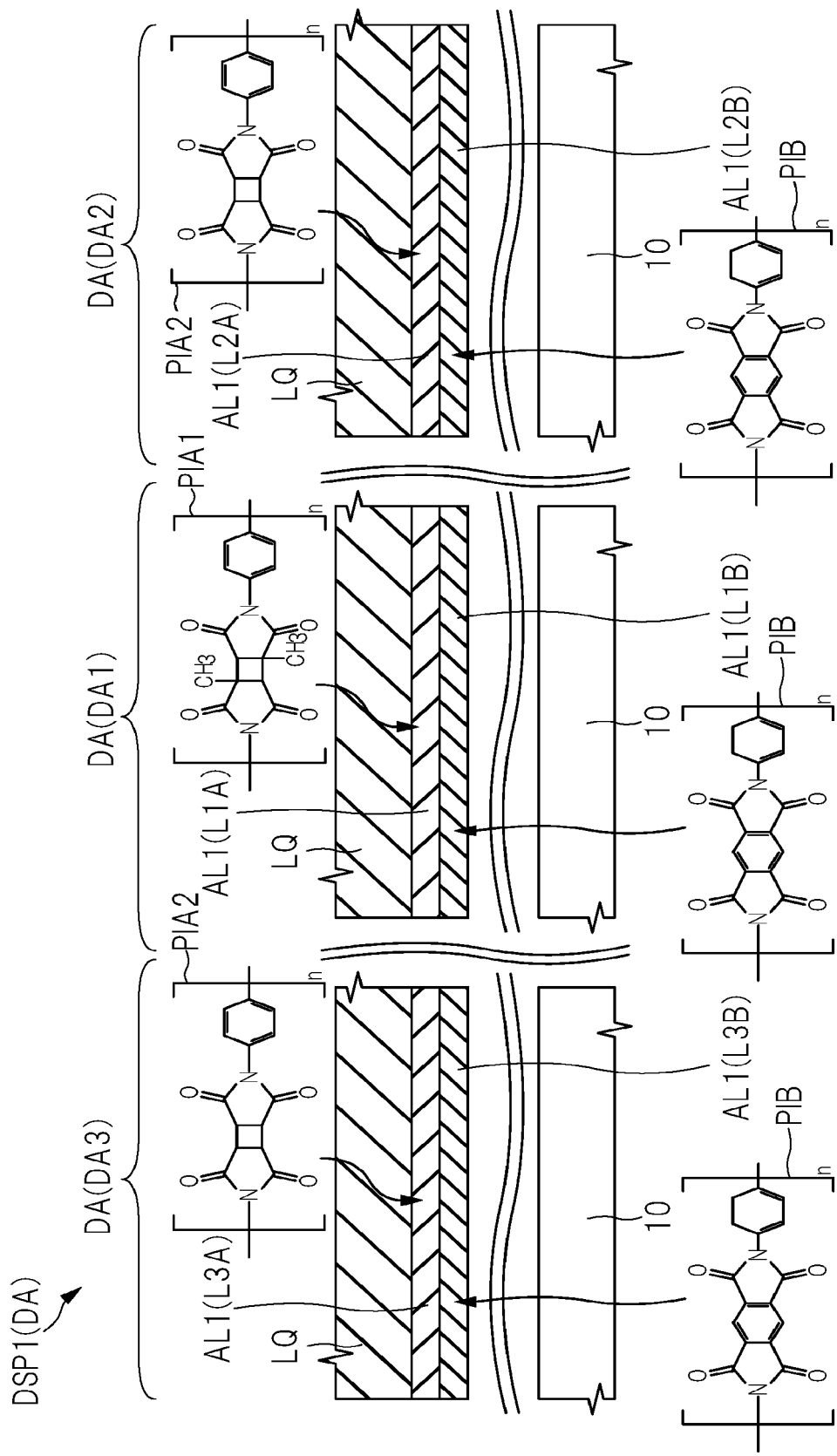
FIG. 6 is an enlarged cross-sectional view showing a configuration example of an alignment film shown in FIG. 4.

Accordingly, the inventors of the present application have studied a technique capable of suppressing the peeling of the alignment film AL1 in the foldable region. More specifically, the inventors have studied a method of providing a configuration having a larger mechanical strength of the alignment film AL1 arranged in the regions DA2 and DA3 shown in FIG. 1 than a mechanical strength of the alignment film AL1 arranged in the region DA1. FIG. 6 is an enlarged cross-sectional view showing an example of the configuration of the alignment film shown in FIG. 4. Note that FIG. 6 clearly shows a boundary between the films in order to clarify that the alignment film AL1 has a layered structure of the films having a different component ratio from one another. However, the boundary between the films may be not always clear in some cases. Alternatively, between two films, a film having a mixture of film materials of these films may be exist in some cases.

As shown in FIG. 6, the alignment film AL1 of the present embodiment includes a film L1A overlapping the region DA1 and a film L1B between the film L1A and the substrate 10. Also, the alignment film AL1 includes a film L2A overlapping the region DA2 and a film L2B between the film L2A and the substrate 10. In the case of the display apparatus DSP1, a material of the film L1A of the alignment film AL1 is different from a material of the film L2A. In other words, a material of the alignment film AL1 in the region DA1 is different from a material of the alignment film AL1 in the region DA2. For example, in an example shown in FIG. 6, the material of the film L1A of the alignment film AL1 is polyimide PIA1 with 1, 3-dimethyl cyclobutane skeleton. The material of the film L2A of the alignment film AL1 is polyimide PIA2 with unsubstituted cyclobutane skeleton. Note that a substituent group of the cyclobutane ring is not limited to a methyl group, and may be an alkyl group with a carbon number that is equal to or smaller than 8, a halogen group such as a chloro group or a fluoro group, or others. Note that the embodiments will be explained below with reference to the 1, 3-dimethyl cyclobutane skeleton as an example of the cyclobutane skeleton having the substituent group. The following embodiments will be explained with reference to an example of the alignment film having two layered films. However, the alignment film is not limited to this, and may be single film.

The cyclobutane ring is easier to be cleaved in the polyimide PIA1 with the cyclobutane skeleton having the substituent group, typical of which is the 1, 3-dimethyl cyclobutane skeleton, than the polyimide PIA2 with the unsubstituted cyclobutane skeleton, by being subjected to the emission of the ultraviolet ray. In other words, since the polyimide PIA1 has a higher photolytic sensitivity for the ultraviolet ray than that of the polyimide PIA2, the alignment property of the polyimide PIA1 is easier to be controlled by the optical alignment treatment. On the other hand, since the polyimide PIA2 has a lower photolytic sensitivity for the ultraviolet ray than that of the polyimide PIA1, the film L2A of the alignment film AL1 has a larger mechanical strength than that of the film L1A at the time of the folding.

In the case of the display apparatus DSP1, the film L2A made of the polyimide PIA2 is arranged at a position overlapping the region DA2 expected to be folded, and the film L1A made of the polyimide PIA1 is arranged in the region DA1 not expected to be folded. In this case, the film L1A of the alignment film AL1 arranged in the region DA1 has a more favorable alignment property than the film L2A of the alignment film AL1 arranged in the region DA2, and therefore, the display quality can be improved. Meanwhile, the film L2A having the larger mechanical strength against the folding is arranged in the region DA2, and therefore, the peeling of the alignment film AL1 due to the folding can be suppressed. As a result, the reduction in the display quality of the region DA2 due to the dusts resulted from the peeling of the alignment film AL1 can be suppressed.

In the present embodiment, the region DA3 is also the foldable region. Therefore, the region DA3 has the similar structure as that of the region DA2. In other words, the alignment film AL1 includes a film L3A overlapping the region DA3 and a film L3B between the film L3A and the substrate 10. A material of the film L3A of the alignment film AL1 is the polyimide PIA2 with the unsubstituted cyclobutane skeleton. Therefore, even when the region DA3 is folded, the reduction in the display quality of the region DA3 due to the dusts resulted from the peeling of the alignment film AL1 can be suppressed.

As described above, note that the material of the film L1A of the alignment film AL1 is the polyimide PIA1 while each material of the films L2A and L3A is the polyimide PIA2. However, a constituent material of each film may be not only the above-described material. For example, the polyimide PIA2 with the unsubstituted cyclobutane skeleton may be contained in the film L1A. Alternatively, the polyimide PIA1 with the 1, 3-dimethyl cyclobutane skeleton may be contained in the film L2A. However, as described above, it is necessary to improve the display quality of the region DA1 and suppress the reduction in the display quality of the region DA2. Therefore, a main skeleton of a main polyimide contained in the film L1A is preferably a skeleton having a high alignment property such as the PIA1. A main skeleton of a main polyimide contained in the film L2A is preferably a skeleton having a large mechanical strength such as the PIA2. For example, when the polyimide PIA1 and the polyimide PIA2 are contained in each of the films L1A and L2A, a mass ratio of the polyimide PTA1 to the polyimide PIA2 is higher in the film L1A than the film L2A.

And, since each of the films L1B, L2B and L3B of the alignment film AL1 shown in FIG. 6 is not in contact with the liquid crystal film LQ, the alignment property of the liquid crystal molecules is not affected by the constituent materials of these films. Meanwhile, in order to improve the mechanical strength of the alignment film AL1, each of the films L2B and L3B of the alignment film AL1 is preferably made of a material having a large mechanical strength. As explained with reference to FIG. 5, in the case of the polyimide PI1 with the unsubstituted cyclobutane ring (hereinafter, appropriately referred to as cyclobutane ring), when the main chain is directed in parallel to the polarization axis UVP of the ultraviolet ray, the cyclobutane ring is easy to be cleaved. Each material of the films L2B and L3B is preferably the polyimide without the cyclobutane ring. The film L1B shown in FIG. 6 is unnecessary to be improved in the mechanical strength because being arranged in the region DA1. However, usage of the same material as those of the films L2B and L3B is preferable to improve the stiffness since the films L1B, L2B and L3B are collectively formed.

In the example shown in FIG. 6, each material of the films L1B, L2B and L3B is polyimide PIB with a pyromellit imide skeleton. The polyimide PIB with the pyromellit imide skeleton is difficult to be fractionated even by being subjected to the emission of the ultraviolet ray at the time of the optical alignment treatment because its main chain does not have the cyclobutane ring. In other words, the polyimide PIB shown in FIG. 6 has a larger mechanical strength than those of the polyimide PIA1 and the polyimide PIA2. Since the films L1B, L2B and L3B having the large mechanical strength are arranged as the base layers of the films L1A, L2A and L3A having the high alignment property as shown in FIG. 6, the films L2A and L3A are enforced by the base layers even when being folded.

Note that a boundary between the film L1A and the film L1B, a boundary between the film L2A and the film L2B and a boundary between the film L3A and the film L3B shown in FIG. 6 may be not clear. The polyimide PIB and the polyimide PIA1 (or the polyimide PIA2) are mixed around the boundary of each film. Each of the films L1B, L2B and L3B may contain the polyimide PIA1 or the polyimide PIA2 with the cyclobutane ring in some cases.

A material having the high photolytic sensitivity for the ultraviolet ray and exhibiting the high alignment property in the optical alignment treatment is polyimide formed by the imidization of the polyamide acid or the polyamide acid ester with the cyclobutane ring, such as the polyimide PIA1 shown in FIG. 6. Particularly when the cyclobutane ring has a substituent group, the alignment property becomes high. Therefore, in the film L1A shown in FIG. 6, a mass ratio of the polyimide formed by the imidization of the polyamide acid or the polyamide acid ester with the cyclobutane ring is preferably equal to or higher than 80%. A configuration example of the polyamide acid or the polyamide acid ester with the cyclobutane ring is expressed by the following chemical formula (1).

[Chemical Formula 1]

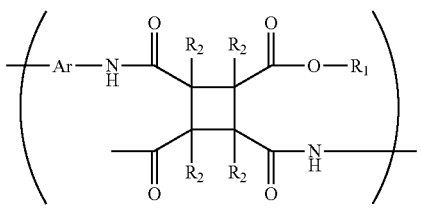

In the chemical formula (1), a term "$R_1$" represents an alkyl group having a carbon number of any of 1 to 8 or a hydroxyl group (OH), respectively. A term "$R_2$" represents a hydrogen atom, a fluorine atom, a chlorine atom, a bromine atom, a phenyl group, an alkyl group having a carbon number of any of 1 to 6, an alkoxy group having a carbon number of any of 1 to 6, a vinyl group (—$(CH_2)_m$-CH=$CH_2$, m=0, 1 or 2), or an acetyl group (—$(CH_2)_m$-C≡CH, m=0, 1 or 2), respectively. A term "Ar" is an aromatic compound.

In order to obtain the alignment property, a lot of polyimide that is formed by the imidization of the polyamide acid containing each unsubstituted R2 of the cyclobutane ring expressed by the chemical formula (1) may be contained in the films L2A and L3A shown in FIG. 6. In the manner, the mechanical strengths of the films L2A and L3A shown in FIG. 6 can be improved.

A lot of polyimide contained in each of the films L1B, L2B and L3B shown in FIG. 6 is preferably the polyimide that is formed by the imidization of the polyamide acid without the cyclobutane ring. A configuration example of the polyamide acid without the cyclobutane ring is expressed by the following chemical formula (2).

[Chemical Formula 2]

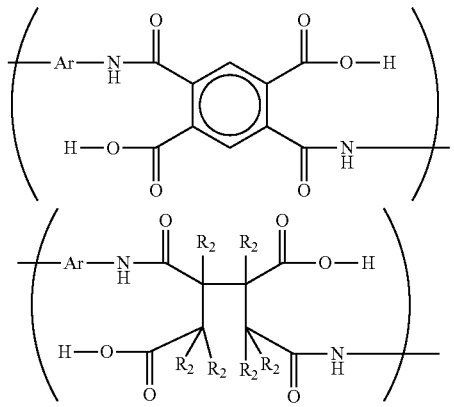

In the chemical formula (2), a term "$R_1$" represents an alkyl group having a carbon number of any of 1 to 8 or a hydroxyl group (OH), respectively. A term "$R_2$" represents a hydrogen atom, a fluorine atom, a chlorine atom, a bromine atom, a phenyl group, an alkyl group having a carbon number of any of 1 to 6, an alkoxy group having a carbon number of any of 1 to 6, a vinyl group (—$(CH_2)_m$-CH=$CH_2$, m=0, 1 or 2), or an acetyl group (—$(CH_2)_m$-C≡CH, m=0, 1 or 2), respectively. A term "Ar" is an aromatic compound.

Main components of the films L1A and L1B shown in FIG. 6 are different materials from each other. However, when diamine having a high polarity is used for the "Ar" portion exemplified by the chemical formula (2), the component configuring the film L1A and the component configuring the film L2B can be separated from each other in a self-alignment manner. In other words, when diamine having a high polarity is used for the "Ar" portion exemplified by the chemical formula (2), a surface energy of the polyamide acid becomes large, and therefore, affinity with the pixel electrode PE (see FIG. 4) and the organic film 15 (see FIG. 4) that are the base film of the alignment film AL1 becomes high. As a result, the polyamide acid without the cyclobutane ring is drawn to the base film, and more polyamide acid expressed by the chemical formula (2) is distributed in the film L1B than the film L1A. When the imidization treatment is performed in this state, for example, a lot of the polyimide without the cyclobutane ring in the main chain such as the polyimide PIB shown in FIG. 6 is contained in the film L1B. On the other hand, a lot of the polyimide with the cyclobutane ring in the main chain such as the polyimide PIA1 shown in FIG. 6 is distributed in the film L1A.

The distribution of the polyimide contained in the film L1A and the film L1B shown in FIG. 6 has been explained above. The distribution of the polyimide contained in the film L2A and the film L2B and the distribution of the polyimide contained in the film L3A and the film L3B can be similarly explained.

Meanwhile, in order to form the polyimide contained in the film L1A and the polyimide contained in the film L2A so that the polyimides are of different types from each other as shown in FIG. 6, it is preferable to apply a different material onto the respective regions at the time of application of the polyamide acid onto the respective regions. In other words, an applying material is applied onto the region DA1 in the step of manufacturing the display apparatus DSP1, the applying material containing the polyamide acid to be changed into the polyimide PIA1 with the 1,3-dimethyl cyclobutane skeleton by the imidization treatment (such as a heating treatment at about 230° C. or dehydration/cyclization treatment using a catalyst) and containing the polyamide acid to be changed into the polyimide PIB with the pyromellit imide skeleton by the imidization treatment. And, another applying material is applied onto the region DA2 and the region DA3, the applying material containing the polyamide acid to be changed into the polyimide PIA2 with the unsubstituted cyclobutane skeleton by the imidization treatment and containing the polyamide acid to be changed into the polyimide PIB with the pyromellit imide skeleton by the imidization treatment. When the different applying materials are applied onto the respective regions as described above, it is preferable to apply the materials by an inkjet method.

Second Embodiment

Figure 7:
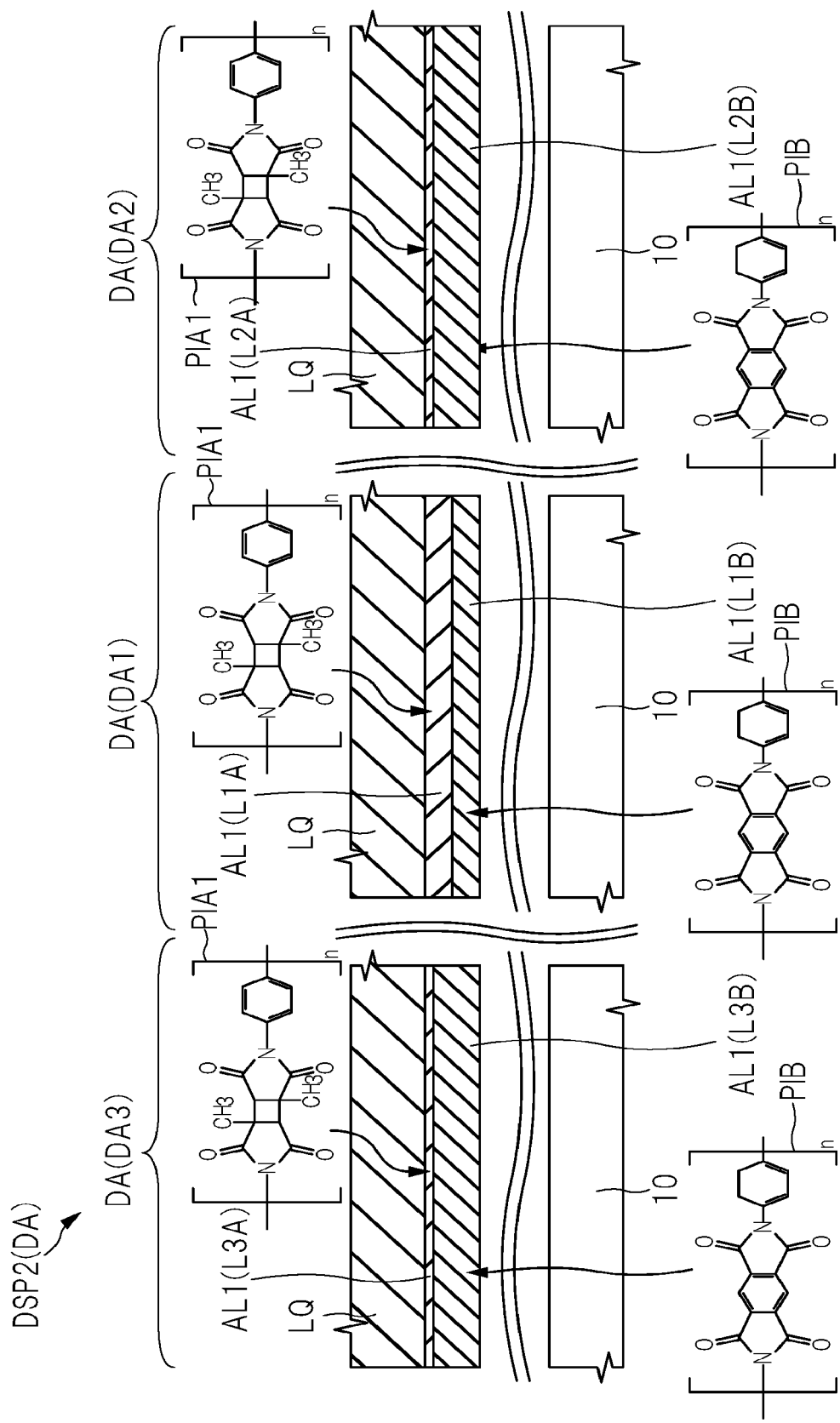
FIG. 7 is an enlarged cross-sectional view of an alignment film of a display apparatus according to a modification example of FIG. 6.

In the case of the display apparatus DSP1 shown in FIG. 6, the above explanation is about the method of improving the display quality by forming the films L1A and L2A of the alignment film from the different materials from each other. In a case of a display apparatus DSP2 shown in FIG. 7, explanation is about a method of suppressing the peeling of the polyimide at the time of the folding by controlling a thickness of the alignment film AL1 that is arranged in the foldable region. FIG. 7 is an enlarged cross-sectional view of an alignment film of a display apparatus according to a modification example of FIG. 6.

As shown in FIG. 7, the alignment film AL1 of the display apparatus DSP2 includes the film L1A overlapping the region DA1 and the film L1B between the film L1A and the substrate 10. The alignment film AL1 also includes the film L2A overlapping the region DA2 and the film L2B between the film L2A and the substrate 10. The display apparatus DSP1 shown in FIG. 6 and the display apparatus DSP2 shown in FIG. 7 are the same as each other in these points. However, the display apparatus DSP2 is different from the display apparatus DSP1 shown in FIG. 6 in the following points. In other words, in the case of the display apparatus DSP2, a thickness of the film L2A of the alignment film AL1 is smaller than a thickness of the film L1A. And, a thickness of the film L2B of the alignment film AL1 is larger than a thickness of the film L1B. The region DA1 and the region DA2 are the same as each other in a thickness of the alignment film AL1. The respective thicknesses of the films L1A and L1B arranged in the region DA1 are about the same as each other (to be a half of the thickness of the alignment film AL1). On the other hand, a thickness of the film L2A arranged in the region DA2 is smaller than a thickness of the film L2B. For example, in the example shown in FIG. 7, the thickness of the film L2A is about 25% of the thickness of the film L2B.

In the display apparatus DSP2, the film L2A and the film L2B are made of the different materials from each other. In this point, the display apparatus DSP2 is the same as the display apparatus DSP1 shown in FIG. 6. In the example shown in FIG. 7, the material of the film L2A of the alignment film AL1 is the polyimide PIA1 with the 1,3-dimethyl cyclobutane skeleton, and the material of the film L2B is the polyimide PIB with the pyromellit imide skeleton. The polyimide PIA1 has the high photolytic sensitivity for the ultraviolet ray as described above, and therefore, has a high alignment property but a small mechanical strength. However, in the case of the display apparatus DSP2, the film L2A is not fractionated even by being subjected to the emission of the ultraviolet ray, and the thickness of the film L2B having a large mechanical strength is large, and therefore, the strength of the film L2A is enhanced. Thus, the alignment film AL1 is structured to be more difficult to be peeled off even when the region DA2 is folded, in comparison with an aspect of simple replacement of the polyimide PIA2 with the polyimide PIA1, the polyimide PIA2 configuring the film L2A in the display apparatus DSP1 shown in FIG. 6.

In the case of the display apparatus DSP2, note that the material of the alignment film AL1 in the region DA2 is the same as the material in the region DA1. Also in this point, the display apparatus DSP2 is different from the display apparatus DSP1 shown in FIG. 6. However, the display apparatus DSP2 shown in FIG. 7 also includes a modification example using the polyimide PIA2 shown in FIG. 6 (in other words, the polyimide with the unsubstituted cyclobutane skeleton) as the material of the film L2A. In this modification example, the mechanical strength of the film L2A can be more enhanced than that of the display apparatus DSP2, and therefore, the peeling of the alignment film AL2 can be more suppressed. Meanwhile, in order to improve the alignment property of the region DA2, the material of the alignment film AL1 in the region DA2 is preferably the same as the material in the region DA1 as described in the display apparatus DSP2.

Except for the above-described differences, the display apparatus DSP2 is the same as the display apparatus DSP1 explained with reference to FIGS. 1 to 6. For example, while the alignment film AL2 includes the film L3A and the film L3B, the structures of the film L3A and the film L3B are the same as the structures of the film L2A and the film L2B. Therefore, the repetitive explanation will be omitted. And, the polyimide contained in each film configuring the alignment film AL1 may be not of one type.

Third Embodiment

Figure 8:
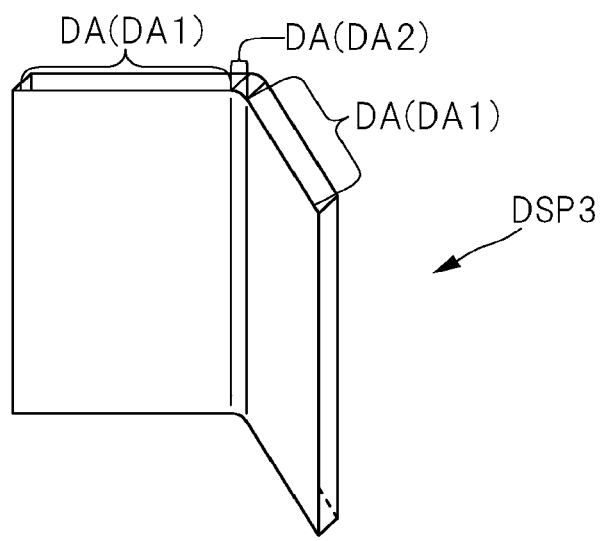
FIG. 8 is a perspective view of a display apparatus according to a modification example of FIG. 1.
Figure 9:
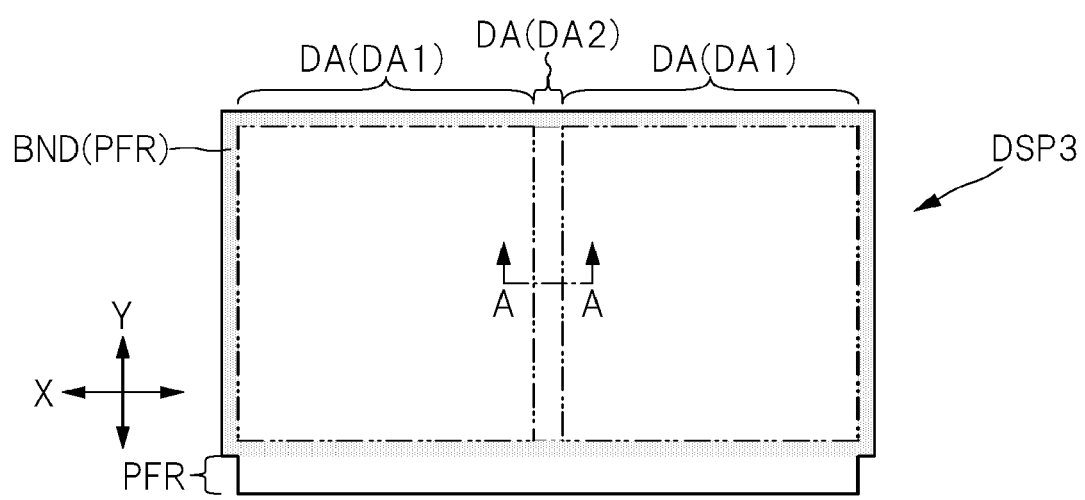
FIG. 9 is a planar view obtained when the display apparatus shown in FIG. 8 is unfolded.
Figure 10:
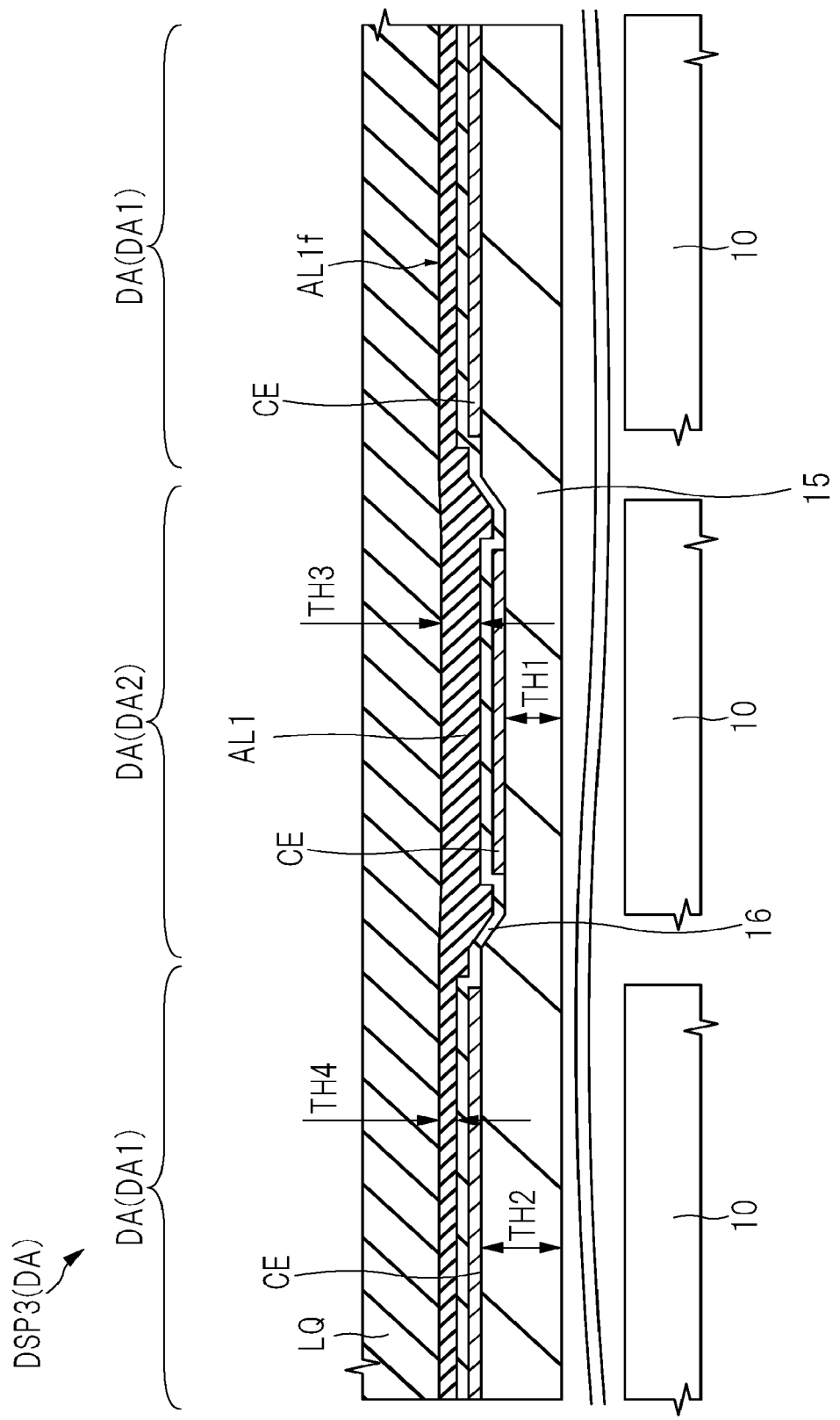
FIG. 10 is an enlarged cross-sectional view taken along a line A-A of FIG. 9.

In a case of a display apparatus DSP3 shown in FIGS. 8 and 9, the display region DA includes a plurality of regions DA1 not expected to be folded, and includes a foldable region DA2 between the adjacent regions DA1. FIG. 8 is a perspective view of a display apparatus according to a modification example of FIG. 1. FIG. 9 is a planar view obtained when the display apparatus shown in FIG. 8 is unfolded. FIG. 10 is an enlarged cross-sectional view taken along a line A-A of FIG. 9.

In the case of the display apparatus DSP3, as shown in FIG. 8, a size of the display apparatus in mobile use can be reduced by folding the display region DA. Further, in the display apparatus DSP3, the images can be visually recognized on a large screen when the folded display region DA is unfolded as shown in FIG. 9. Note that a plurality of pixels PX each having the transistor Tr1 (see FIG. 2), the scan line GL connected to the plurality of pixels PX, the image signal line SL, the common electrode CE and others are arranged in the display region DA as similar to the display apparatus DSP1 shown in FIG. 1 although not illustrated in FIG. 9.

In the display apparatus DSP3, the region DA2 is folded. Therefore, as similar to the case of the display apparatus DSP1 shown in FIG. 6, it is necessary to suppress the peeling of the alignment film AL1 (see FIG. 10) when the region DA2 is folded. As a method for suppressing the peeling of the alignment film AL1 in the region DA2, a method explained with reference to FIGS. 6 and 7 is applied in some cases. However, in the present embodiment, another method will be explained.

As shown in FIG. 10, the display apparatus DSP3 includes an organic film 15 between the substrate 10 and the alignment film AL1. The organic film 15 is a planarizing film that covers the transistor Tr1 as shown in FIG. 4. In the case of the display apparatus DSP3, a thickness TH1 of the organic film 15 at a position overlapping the region DA2 is smaller than a thickness TH2 of the organic film 15 at a position overlapping the region DA1. A coating liquid to become the alignment film AL1 is made of a liquid material with low viscosity at the time of the application. Therefore, when a surface to be applied has surface irregularity, the coating liquid is applied to be thicker onto a concave portion than a convex portion. As a result, as shown in FIG. 10, a thickness TH3 of the alignment film AL1 at a position overlapping the region DA2 is larger than a thickness TH4 of the alignment film AL1 at a position overlapping the region DA1.

In the optical alignment treatment, the ultraviolet ray is emitted from a side of the front surface AL1$f$ of the alignment film AL1 (in other words, a side of a surface in contact with the liquid crystal film LQ). Therefore, when the thickness of the alignment film AL1 is large, the ultraviolet ray is difficult to reach the back surface opposite to the front surface AL1$f$. Therefore, at the position overlapping the region DA2, a lot of the polyimide that is not fractionated by the ultraviolet ray remain on the back surface of the alignment film AL1. As a result, at the position overlapping the region DA2, the strength of the alignment film AL1 can be enhanced. In this method, as similar to the polyimide PIA1 and the polyimide PIA2 shown in FIG. 6, the entire alignment film AL1 may be made of, for example, the polyimide with the cyclobutane skeleton.

However, in order to enhance the strength of the alignment film AL1, as similar to the display apparatus DSP1 explained with reference to FIG. 6, the polyimide (such as the polyimide PIB with the pyromellit imide skeleton shown in FIGS. 6 and 7) that is formed by imidization of the polyamide acid without the cyclobutane ring is preferably contained in the alignment film AL1 at the position overlapping the region DA2 in the display apparatus DSP3.

In the alignment film of the display apparatus DPS3 shown in FIG. 10, as similar to the display apparatus DSP1 shown in FIG. 6, it is preferable in the region DA1 to arrange a lot of the polyimide with the dimethyl cyclobutane ring such as the polyimide PIA1 with the 1,3-dimethyl cyclobutane skeleton, and it is preferable in the region DA2 to arrange a lot of the polyimide PIA2 with the unsubstituted cyclobutane ring. In the display apparatus DSP3, in order to make difference in the constituent material of the alignment film between the region DA1 and the region DA2, an applying amount per unit area in the region DA2 is made larger than an applying amount per unit area in the region DA1 in the step of applying the applying liquid to be a source material of the alignment film AL1. As shown in FIG. 10, this manner provides the alignment film AL1 that is structured so that the thickness TH3 is larger than the thickness TH4, and so that the region DA1 and the region DA2 are made of the different materials from each other.

Except for the above-described differences, the display apparatus DSP3 is the same as the display apparatus DSP1 explained with reference to FIGS. 1 to 6 or the display apparatus DSP2 explained with reference to FIG. 7. Therefore, the repetitive explanation will be omitted. As a modification example of the present embodiment, note that the technique explained with reference to FIGS. 8 to 10 such as the technique of thinning the organic film 15 for improving the mechanical strength of the foldable region DA2 is applicable to the display apparatus DSP1 shown in FIG. 1 and the display apparatus DSP2 shown in FIG. 7.

Fourth Embodiment

Figure 11:
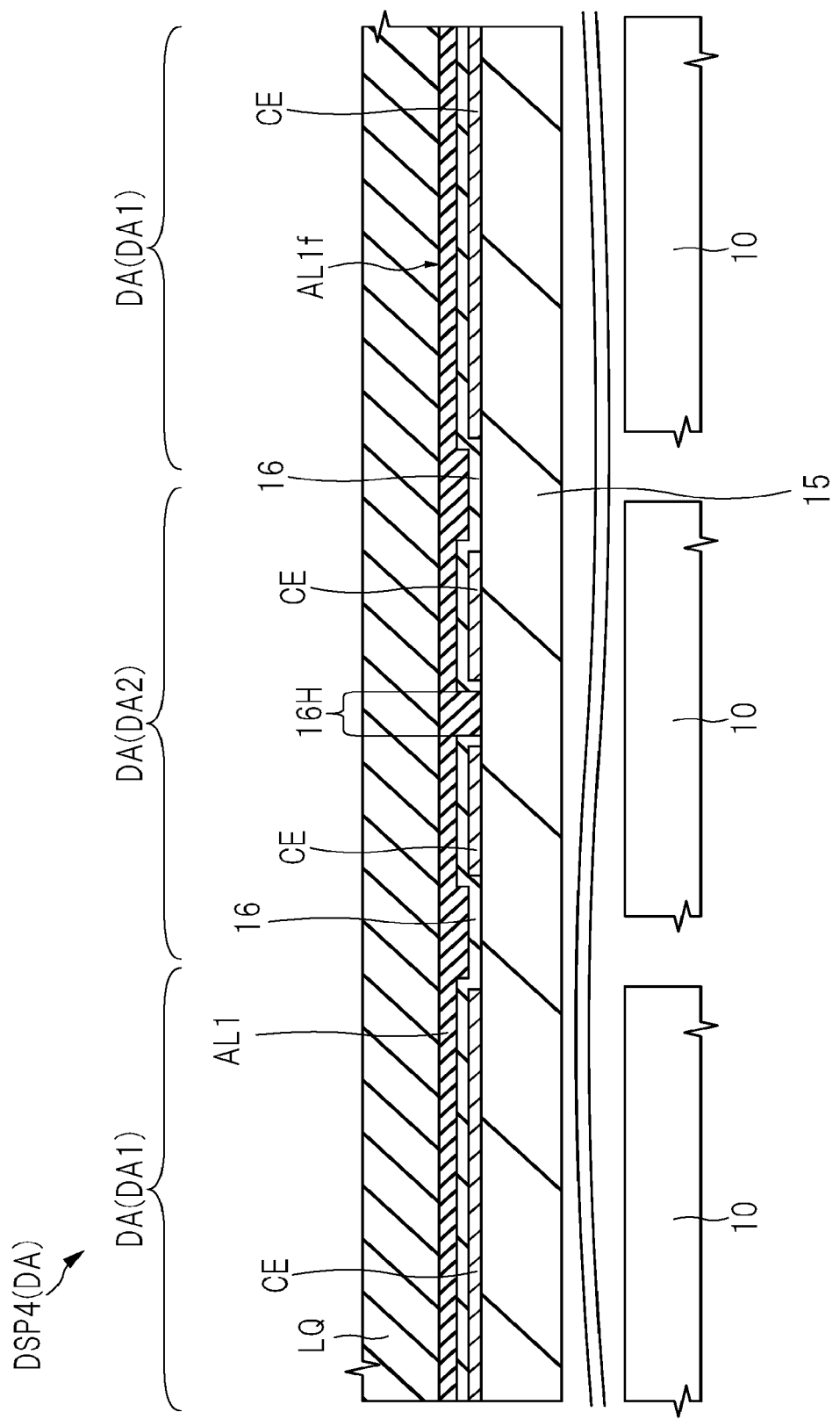
FIG. 11 is an enlarged cross-sectional view of a display apparatus according to a modification example of FIG. 10.

In the present embodiment, an aspect of controlling the distribution of the polyimide type in the alignment film AL1 by bringing a high-hydrophobic film into contact with the alignment film AL1 will be explained. FIG. 11 is an enlarged cross-sectional view of a display apparatus according to a modification example of FIG. 10.

A display apparatus DSP4 shown in FIG. 11 includes the organic film 15 between the substrate 10 and the alignment film AL1. The organic film 15 is the planarizing film that covers the transistor Tr1. The display apparatus DSP4 also includes an insulating film 16 that is an inorganic film that covers the organic film 15. The insulating film 16 is an inorganic insulating film between the plurality of pixel electrodes PE and the common electrode CE shown in FIG. 4. The insulating film 16 has an opening 16H at a position overlapping the region DA2. The alignment film AL1 is in contact with the organic film 15 through the opening 16H of the insulating film 16.

The organic film 15 has higher hydrophobicity than that of the insulating film 16 that is the inorganic film. In the structure in which the alignment film AL1 is in contact with the organic film 15 made of the high-hydrophobic material, the distribution of the polyimide type in the alignment film AL1 can be controlled. For example, in comparison between the above-described polyamide acid ester with the cyclobutane ring expressed by the chemical formula (1) and the above-described polyamide acid ester without the cyclobutane ring expressed by the chemical formula (2), the polyamide acid ester expressed by the chemical formula (2) has higher affinity with the organic film 15. Therefore, when a part of the applying liquid with the mixture of the polyamide acid ester, the polyamide acid and the solvent is in contact with the high-hydrophobic organic film 15, the polyamide acid without the cyclobutane ring expressed by the chemical formula (2) tends to gather at a position near the organic film 15. In this case, the polyamide acid with the cyclobutane ring expressed by the chemical formula (1) tends to gather at a position that is far from the organic film 15, in other words, gather at a position closer to the front surface AL1$f$ of the alignment film AL1.

According to the present embodiment, the organic film 15 and the alignment film AL1 are in contact with each other at the position overlapping the region DA2. Therefore, at the position overlapping the region DA2 in the alignment film AL1, a material having higher affinity with the organic film 15 tends to gather in a lower film (that is farther from the liquid crystal film LQ). Therefore, for example, when the alignment film AL1 includes the film L2A and the film L2B as shown in FIG. 6, the film L2B contains a lot of the polyimide PIB having high affinity with the organic film 15, and the film L2A contains a lot of the polyimide PIA2 having low affinity with the organic film 15.

In an example shown in FIG. 11, note that the pixel PX (see FIG. 1) is also arranged in the region DA2, and therefore, the common electrode CE is arranged in the region DA2. However, for example, if the pixel PX is not arranged in the region DA2 since the region DA2 is narrow, the common electrode CE may be not arranged. Since this case has no common electrode CE and insulating film 16 in the region DA2 shown in FIG. 11, the thickness of the alignment film AL2 in the region DA2 is larger than the thickness of the alignment film AL1 in the region DA1. Although not illustrated, the thickness of the organic film 15 in the region DA2 of the display apparatus DSP4 shown in FIG. 11 may be made small by combination of the structure shown in FIG. 11 and the structure shown in FIG. 10.

Except for the above-described differences, the display apparatus DSP4 is the same as the display apparatus DSP1 explained with reference to FIGS. 1 to 6, the display apparatus DSP2 explained with reference to FIG. 7 or the display apparatus DSP3 explained with reference to FIGS. 8 to 10. Therefore, the repetitive explanation will be omitted. Note that combination of the technique explained in the present embodiment and the technique explained in another embodiment may be applied. For example, the case using the display apparatus DSP4 for the display apparatus of the type causing the region DA to be folded has been exemplified as similar to the display apparatus DSP3 shown in FIG. 8. However, the display apparatus may be used for a display apparatus of a type causing regions on both sides of the region DA1 to be folded, as described in the display apparatus DSP1 shown in FIG. 3.

Fifth Embodiment

Figure 12:
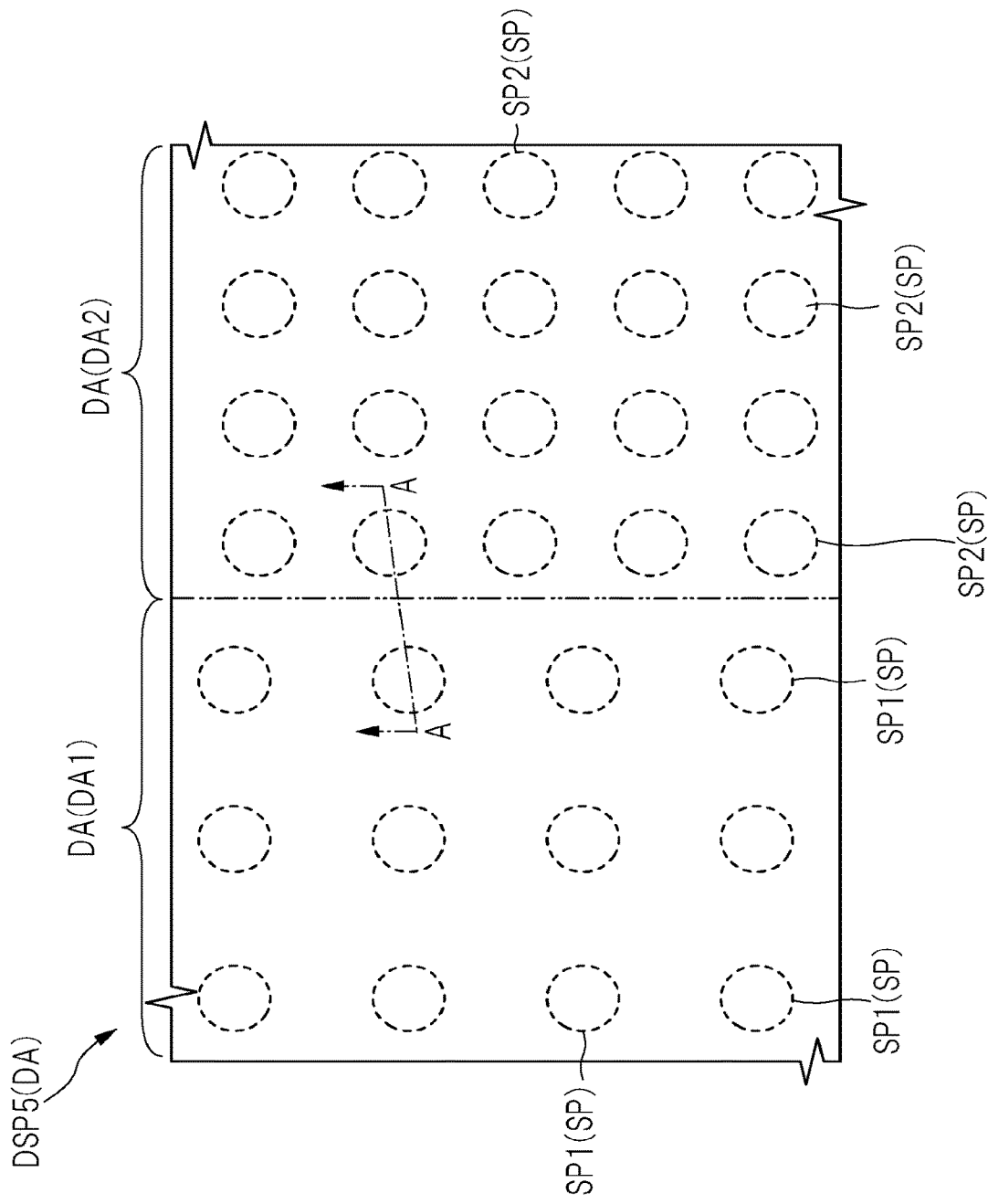
FIG. 12 is an enlarged planar view of a display apparatus according to a modification example of FIG. 1.
Figure 13:
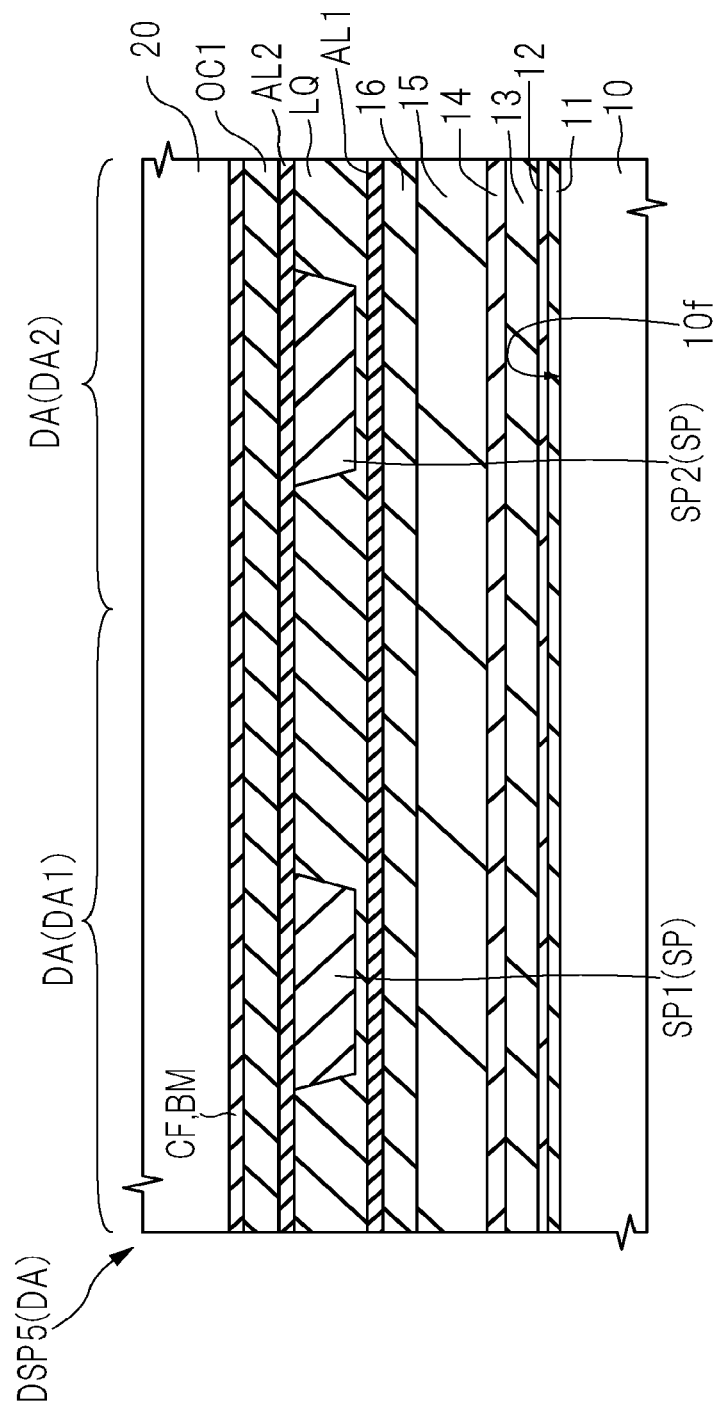
FIG. 13 is an enlarged cross-sectional view taken along a line A-A of FIG. 12.

The present embodiment will be explained regarding an aspect for suppressing the peeling of the alignment film AL1 in the foldable region by reducing a physical stress applied on the alignment film AL1 in the foldable region. FIG. 12 is an enlarged planar view of a display apparatus according to a modification example of FIG. 1. FIG. 13 is an enlarged cross-sectional view taken along a line A-A of FIG. 12. FIG. 14 is an enlarged planar view of a display apparatus according to a modification example of FIG. 12. In FIGS. 12 and 14, an outline of a top portion of a spacer member SP2 having a circular truncated cone shape is illustrated with a dotted line.

A display apparatus DSP5 includes a substrate 20 (see FIG. 13) that faces but separates from the substrate 10 in the regions DA1 and DA2. The display apparatus DSP5 includes a plurality of spacer members SP arranged between the substrate 10 and the substrate 20 at positions overlapping the region DA1 and the region DA2.

In the case of the liquid crystal display apparatus, the extremely small thickness of the liquid crystal film LQ reduces the display quality. Therefore, as seen in the display apparatus DSP5, it is preferable, between the substrate 10 and the substrate 20, to arrange the plurality of spacer members SP for maintaining the thickness of the liquid crystal film LQ. In an example shown in FIG. 13, each of the plurality of spacer members SP is fixed to a portion closer to the substrate 20. However, the spacer member SP merely has to be fixed to either the substrate 10 or the substrate 20, and the fixing includes various modification examples in addition to the example of FIG. 13. For example, each of the plurality of spacer members SP may be fixed to a portion closer to the substrate 10. Alternatively, a plurality of spacer members SP that are fixed to the portion closer to the substrate 10 and a plurality of spacer members SP that are fixed to a portion closer to the substrate 20 may be mixed.

The plurality of spacer members SP include a plurality of spacer members SP1 arranged at the positions overlapping the region DA1 and a plurality of spacer members SP2 arranged at the positions overlapping the region DA2. The spacer members SP are members for suppressing the extremely-small thickness of the liquid crystal film LQ as described above, in other words, the extremely-small separate distance between the substrate 10 and the substrate 20. Therefore, when the liquid crystal film LQ is temporarily thinned due to the application of external force onto the display apparatus DSP5, the top portions of the spacer members SP are in contact with the alignment film AL1. In this case, it is preferable to suppress the peeling of a part of the alignment film AL1 due to the contact of the spacer members SP. Particularly, in the region DA2 expected to be folded in use, there is a high possibility that the spacer members SP2 and the alignment film AL2 are in contact with each other.

Accordingly, in the case of the display apparatus DSP5, when the spacer members SP2 are densely arranged in the region DA2, the stress applied when each spacer member SP2 is in contact with the alignment film AL1 is reduced. As shown in FIG. 12, in the case of the display apparatus DSP5, an arrangement density of the plurality of spacer members SP2 at the positions overlapping the region DA2 is higher than an arrangement density of the plurality of spacer members SP1 at the positions overlapping the region DA1. In other words, in a planar view, a distance between the adjacent spacer members SP2 is smaller than a distance between the adjacent spacer members SP1. In this case, when the region DA2 is folded, although the spacer members SP2 are in contact with the alignment film AL1, the force locally applied on the alignment film AL2 is small. Therefore, the alignment film AL1 is suppressed to be scratched and peeled off by the spacer members SP2.

Further, in order to suppress the spacer members SP2 from scratching the alignment film AL1, it is preferable to increase an area of the top portion of each of the plurality of spacer members SP2 as described in a display apparatus DSP6 shown in FIG. 14. The display apparatus DSP6 shown in FIG. 14 is different from the display apparatus DSP5 shown in FIG. 12 in that a width SPW2 of the top portion of each of the spacer members SP2 at the positions overlapping the region DA2 is larger than a width SPW1 of the top portion of each of the spacer members SP1 at the positions overlapping the region DA1. In other words, the area of the top portion of each of the spacer members SP2 included in the display apparatus DSP6 is larger than the area of the top portion of each of the spacer members SP1 therein.

Each of the plurality of spacer members SP has a circular truncated cone shape, a truncated pyramid shape or others. In the example shown in FIGS. 12 and 14, the spacer member SP has the circular truncated cone shape. When the spacer members SP and the alignment film AL1 are in contact with each other, the top portions of the spacer members SP each having the circular truncated cone shape or the truncated pyramid shape are in contact with the alignment film AL1.

When the area of the top portion of each of the plurality of spacer members SP2 is large, a contact area between the top portion of each of the spacer members SP2 and the alignment film AL1 is large. As a result, it is suppressed to apply the force collected on apart of the alignment film AL1, and therefore, the alignment film AL1 is suppressed to be scratched and peeled off by the spacer members SP2.

The techniques as described above are applicable to not only the above-described various modification examples but also another modification examples. For example, in the above explanation, the example of folding the regions DA2 and DA3 on both sides of the region DA1 to be curved in the display region DA as shown in FIG. 3 and the example of the display apparatus that is foldable along the region DA2 as shown in FIG. 8 have been exemplified. A folding method and a layout of the foldable region include not only the above-described examples but also various modification examples.

The structure of the display apparatus DSP2 explained with reference to FIG. 7 can be stated as follows.

The display apparatus includes: a flexible first substrate configured to include a first region and a second region on its surface; a liquid crystal layer; and a photolytic alignment film configured to be in contact with the liquid crystal layer, the alignment film is configured to include: a first A film overlapping the first region; and a first B film between the first A film and the first substrate, the alignment film is configured to include: a second A film overlapping the second region; and a second B film between the second A film and the first substrate, a thickness of the second A film of the alignment film is smaller than a thickness of the first A film, and a thickness of the second B film of the alignment film is larger than a thickness of the first B film.

In the scope of the concept of the present invention, various modification examples and alteration examples could have been easily anticipated by those who are skilled in the art, and it would be understood that these various modification examples and alteration examples are within the scope of the present invention. For example, the ones obtained by appropriate addition, removal, or design-change of the components to/from/into each of the above-described embodiments by those who are skilled in the art or obtained by addition, omitting, or condition-change of the step to/from/into each of the above-described embodiments are also within the scope of the present invention as long as they include the concept of the present invention.

INDUSTRIAL APPLICABILITY

The present invention can be utilized for a display apparatus and electronic equipment in which the display apparatus is embedded.

EXPLANATION OF REFERENCE CHARACTERS 10, 20: substrate
10*b*, 20*b*: back surface (main surface, rear surface)
10*f*, 20*f*: front surface (main surface, front surface)
11, 12, 13, 14, 16, OC1: insulating film
15: organic film (planarizing film, organic insulating film)
16H: opening
AL1, AL2: alignment film
AL1*f*: front surface
ALP: alignment film
BM: light blocking film
BND: sealing member
CD: common-electrode driving circuit
CDP: conductor pattern
CE: common electrode
CF: color filter
DA: display region
DA1: region (first region)
DA2: region (second region)
DA3: region (third region)
DE: drain electrode
DSP1, DSP2, DSP3, DSP4, DSP5, DSP6: display apparatus
GD: scan-line driving circuit (gate driving circuit)
GE: gate electrode
GL: scan line (gate line)
Gsi: scan signal
L1A, L1B, L2A, L2B, L3A, L3B: film
LQ: liquid crystal layer
PE: pixel electrode
PFR: peripheral region
PI1, PIA1, PIA2, PIB: polyimide
PI2: composite
PX: pixel
SCR: semiconductor region (semiconductor layer)
SD: signal-line driving circuit
SE: source electrode
SL: image signal line (source line)
SP, SP1, SP2: spacer member
Spic: image signal
SPW1, SPW2: width
SUB1: substrate
Tr1: transistor
UVP: polarization axis

The invention claimed is:
1. A display apparatus comprising:
a flexible first substrate configured to include a first region and a second region on its surface;
a liquid crystal layer; and a photolytic alignment film configured to be in contact with the liquid crystal layer,
wherein a material of the alignment film in the first region is different from a material of the alignment film in the second region,
wherein the alignment film includes: a first A film configured to overlap the first region; and a first B film between the first A film and the first substrate,
the alignment film includes: a second A film configured to overlap the second region; and a second B film between the second A film and the first substrate, and
a material of the first A film is different from a material of the second A film.

2. The display apparatus according to claim 1,
wherein the material of the first A film is polyimide with a cyclobutane skeleton having a substituent group, and
the material of the second A film is polyimide with an unsubstituted cyclobutane skeleton.

3. The display apparatus according to claim 2,
wherein each material of the first B film and the second B film is polyimide with a pyromellit imide skeleton.

4. A display apparatus comprising:
a flexible first substrate configured to include a first region and a second region on its surface;
a liquid crystal layer; and
an alignment film configured to be in contact with the liquid crystal layer,
wherein the alignment film includes: first polyimide with a cyclobutane ring having a substituent group; and second polyimide with an unsubstituted cyclobutane ring,
the alignment film includes a first A film in the first region and a first B film between the first A film and the first substrate,
the alignment film includes a second A film in the second region and a second B film between the second A film and the first substrate, and
a mass ratio of the first polyimide to the second polyimide is higher in the first A film than the second A film.

5. The display apparatus according to claim 1 further comprising:
a first transistor on the first substrate; and
a first organic film between the first substrate and the alignment film, configured to cover the first transistor,
wherein a thickness of the first organic film at a position overlapping the second region is smaller than a thickness of the first organic film at a position overlapping the first region.

6. The display apparatus according to claim 1 further comprising:
a first transistor on the first substrate;
a first organic film between the first substrate and the alignment film, configured to cover the first transistor; and
a first inorganic film configured to cover the first organic film,
wherein the first inorganic film has an opening at a position overlapping the second region, and,
in the second region, the alignment film is in contact with the first organic film through the opening of the first inorganic film.

7. The display apparatus according to claim 4 further comprising:
a second substrate configured to face the first substrate and separate from the first substrate in the first region and the second region; and
a plurality of spacer members arranged between the first substrate and the second substrate at each of a position overlapping the first region and a position overlapping the second region,
wherein an arrangement density of a second spacer member at the position overlapping the second region is higher than an arrangement density of a first spacer member at the position overlapping the first region.

8. The display apparatus according to claim 1 further comprising:
a second substrate configured to face the first substrate and separate from the first substrate in the first region and the second region; and
a plurality of spacer members arranged between the first substrate and the second substrate at each of a position overlapping the first region and a position overlapping the second region,
wherein a width of a top portion of a second spacer member at the position overlapping the second region is larger than a width of a top portion of a first spacer member at the position overlapping the first region.

9. The display apparatus according to claim 1,
wherein the first region is a foldable region, and
the second region is a region that is not foldable.

10. The display apparatus according to claim 2 further comprising:
a first transistor on the first substrate; and
a first organic film between the first substrate and the alignment film, configured to cover the first transistor,
wherein a thickness of the first organic film at a position overlapping the second region is smaller than a thickness of the first organic film at a position overlapping the first region.

11. The display apparatus according to claim 5 further comprising:
a second substrate configured to face the first substrate and separate from the first substrate in the first region and the second region; and
a plurality of spacer members arranged between the first substrate and the second substrate at each of a position overlapping the first region and a position overlapping the second region,
wherein an arrangement density of a second spacer member at the position overlapping the second region is higher than an arrangement density of a first spacer member at the position overlapping the first region.

12. The display apparatus according to claim 10 further comprising:
a first transistor on the first substrate;
a first organic film between the first substrate and the alignment film, configured to cover the first transistor; and
a first inorganic film configured to cover the first organic film,
wherein the first inorganic film has an opening at a position overlapping the second region, and,
in the second region, the alignment film is in contact with the first organic film through the opening of the first inorganic film.

13. The display apparatus according to claim 4 further comprising:
a first transistor on the first substrate;
a first organic film between the first substrate and the alignment film, configured to cover the first transistor; and
a first inorganic film configured to cover the first organic film, wherein the first inorganic film has an opening at a position overlapping the second region, and, in the second region, the alignment film is in contact with the first organic film through the opening of the first inorganic film.

14. The display apparatus according to claim 13 further comprising:

a second substrate configured to face the first substrate and separate from the first substrate in the first region and the second region; and a plurality of spacer met bens arranged between the first substrate and the second substrate at each of a position overlapping the first region and a position overlapping the second region, wherein an arrangement density of a second spacer member at the position overlapping the second region is higher than an arrangement density of a first spacer member at the position overlapping the first region.

15. The display apparatus according to claim 14 further comprising:

a second substrate configured to face the first substrate and separate from the first substrate in the first region and the second region; and a plurality of spacer members arranged between the first substrate and the second substrate at each of a position overlapping the first region and a position overlapping the second region, wherein a width of a top portion of a second spacer member at the position overlapping the second region is larger than a width of a top portion of a first spacer member at the position overlapping the first region.

16. The display apparatus according to claim 4 further comprising:

a second substrate configured to face the first substrate and separate from the first substrate in the first region and the second region; and a plurality of spacer members arranged between the first substrate and the second substrate at each of a position overlapping the first region and a position overlapping the second region, wherein a width of a top portion of a second spacer member at the position overlapping the second region is larger than a width of a top portion of a first spacer member at the position overlapping the first region.

17. The display apparatus according to claim 16 further comprising:

a second substrate configured to face the first substrate and separate from the first substrate in the first region and the second region; and a plurality of spacer members arranged between the first substrate and the second substrate at each of a position overlapping the first region and a position overlapping the second region, wherein an arrangement density of a second spacer member at the position overlapping the second region is higher than an arrangement density of a first spacer member at the position overlapping the first region.

18. The display apparatus according to claim 2, wherein the first region is a foldable region, and the second region is a region that is not foldable.

* * * * *